US 6,453,345 B2

(12) United States Patent
Trcka et al.

(10) Patent No.: US 6,453,345 B2
(45) Date of Patent: *Sep. 17, 2002

(54) NETWORK SECURITY AND SURVEILLANCE SYSTEM

(75) Inventors: Milan V. Trcka, Claremont; Kenneth T. Fallon, Upland; Mark R. Jones, Laguna Hills, all of CA (US); Ronald W. Walker, Reston, VA (US)

(73) Assignee: Datadirect Networks, Inc., Chatsworth, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/852,759

(22) Filed: May 7, 1997

(Under 37 CFR 1.47)

Related U.S. Application Data

(60) Provisional application No. 60/030,446, filed on Nov. 6, 1996.

(51) Int. Cl.[7] ......................... G06F 15/173; G06F 11/00

(52) U.S. Cl. ..................... 709/224; 709/223; 713/201; 714/39; 714/47

(58) Field of Search ................................. 709/224, 225, 709/231, 229, 223; 713/200, 201; 714/4, 39, 47

(56) References Cited

U.S. PATENT DOCUMENTS

| 4,866,711 | A | | 9/1989 | Borup et al. | |
|---|---|---|---|---|---|
| 5,032,979 | A | | 7/1991 | Hecht et al. | |
| 5,138,710 | A | | 8/1992 | Kruesi et al. | |
| 5,373,501 | A | * | 12/1994 | Roland | 370/250 |
| 5,530,899 | A | * | 6/1996 | MacDonald | 710/17 |
| 5,621,889 | A | * | 4/1997 | Lermuzeaux et al. | 713/200 |
| 5,751,997 | A | * | 5/1998 | Kullic et al. | 711/161 |
| 5,787,253 | A | * | 7/1998 | McCreery | 709/231 |
| 5,796,942 | A | * | 8/1998 | Esbenson | 713/201 |
| 5,826,014 | A | * | 10/1998 | Coley et al. | 713/201 |
| 5,835,722 | A | * | 11/1998 | Bradshaw et al. | 709/225 |
| 5,878,420 | A | * | 3/1999 | De La Salle | 707/10 |
| 5,884,025 | A | * | 3/1999 | Baehr et al. | 713/201 |
| 5,898,830 | A | * | 4/1999 | Wesinger, Jr. et al. | 713/201 |
| 5,919,258 | A | * | 7/1999 | Kayashima et al. | 713/201 |
| 5,953,507 | A | * | 9/1999 | Cheung et al. | 709/200 |

OTHER PUBLICATIONS

"Firewalls and Internet Security Repelling the Wily Hacker", Addison–Wesley Publishing Company.
"Internet Access: The International Angle", Special Report/International ISPS, vol. 24, No. 16, p. 51; Nov. 21, 1995.
"Controlling connections; Delmarva Power and Light Co."; American Society for Industrial Security Management; vol. 39; No.a 10; p. 15; ISSN: 0145–9406; Oct., 1995.

(List continued on next page.)

*Primary Examiner*—Glenton B. Burgess
*Assistant Examiner*—Abdullahi E. Salad
(74) *Attorney, Agent, or Firm*—Blakely Sokoloff Taylor & Zafman

(57) ABSTRACT

A network security and surveillance system passively monitors and records the traffic present on a local area network, wide area network, or other type of computer network, without interrupting or otherwise interfering with the flow of the traffic. Raw data packets present on the network are continuously routed (with optional packet encryption) to a high-capacity data recorder to generate low-level recordings for archival purposes. The raw data packets are also optionally routed to one or more cyclic data recorders to generate temporary records that are used to automatically monitor the traffic in near-real-time. A set of analysis applications and other software routines allows authorized users to interactively analyze the low-level traffic recordings to evaluate network attacks, internal and external security breaches, network problems, and other types of network events.

24 Claims, 18 Drawing Sheets

OTHER PUBLICATIONS

"Lab Test Vendor Participants", Data Comm Lab Test/Network Security; vol. 24, No. 6, p. 72, May, 1995.

Network-to-network communication.Novell's NetWare for DEC Access 1.1 network integration software; Product Announcement; Cardinal Business Media Inc. Digital Age; vol. 14; No. 9; p. 14.

"Desperate Times Call for Desperate Measures"; CMP Publications Inc. Network Computing; vol. 7; No. 3; p. 72; Mar. 1, 1996.

"Open Group closes in on security and specification; consolidation of Open Software Foundation, X/Open to release baseline security services; Industry Trend or Event"; PC Week; vol. 13; No. 18; p. 6; ISSN: 0740–1604, May 6, 1996.

"Audit-trail software helps maximize LANs", PC Week; vol. 6; No. 3; p. 67; ISSN: 0740–1604 Jan. 22, 1990.

Datatape Overview brochure, Backgrounder 6/96.

Touch Technologies, Inc., brochure package—includes brochure and various materials on Intouch NSA Network Security Agent.

* cited by examiner

| SOM | H | TS | PACKET | TS | PACKET | TS | PACKET | ••• | EOM |

| TS | PACKET | TS | PACKET | TS | PACKET | TS | PACKET | ••• |

KEY

SOM = START OF MEDIA
H = MEDIA HEADER
TS = TIME/DATE STAMP
EOM = END OF MEDIA

INTERACTIVE ANALYSIS

SELECT ANALYSIS OPTION     SELECT TYPE

[AUDIT] →     [LOGONS] →

ALARMS
- INTRUDER ALARM
- RATE OF ERROR THRESHOLD
- UTILIZATION THRESHOLD
- COLLISION % THRESHOLD

ENTER PARAMETERS AND SETTINGS

| | | |
|---|---|---|
| TYPE OF LOGON ACTIVITY | [ALL] → | |
| START DATE | [10/23/96] | END DATE [10/23/96] |
| START TIME | [1:00 AM] | END TIME [8:30 PM] → |
| OUTPUT TYPE | [DISPLAY SCREEN] | MORE..... |

210 — (ALARMS)
208 — (parameters section)

FIG. 13

ACTIVITY | ALL LOGONS

PERIOD DATE, FROM: 10/23/96  START TIME: 1:00 AM
TO: 10/23/96  END TIME: 8:30 PM

| TIME | DATE | TYPE | ADDR | DST ADDR | USER ID |
|---|---|---|---|---|---|
| 08:31 AM | 10/23 | NFS | 023456 | 345892 | BOB |
| 08:35 AM | 10/23 | CIFS | 458962 | 536536 | KTF |
| 08:40 AM | 10/23 | NFS | 023456 | 345892 | BOB |
| 08:42 AM | 10/23 | NFS | 345892 | 023456 | JENNY |
| 08:45 AM | 10/23 | NET | 023456 | 345892 | BOB |
| 08:48 AM | 10/23 | ACP | 023456 | 345892 | BOB |
| 09:01 AM | 10/23 | FTP | 456901 | 873456 | MARY |
| 09:05 AM | 10/23 | FTP | 876456 | 456901 | FRANK |
| 09:10 AM | 10/23 | NFS | 637899 | 369304 | JACK |
| 09:15 AM | 10/23 | NFS | 023456 | 345892 | BOB |
| 09:18 AM | 10/23 | NFS | 637899 | 369304 | JACK |

...more

FILTER | SEARCH

OPTIONAL ZOOM IN DATA

FIG. 15

INTERACTIVE ANALYSIS

SELECT ANALYSIS OPTION

[PROBLEM DETERMINATION ➡]

SELECT TYPE

[LOGONS]

ALARMS
- INTRUDER ALARM
- RATE OF ERROR THRESHOLD
- UTILIZATION THRESHOLD
- COLLISION % THRESHOLD

ENTER PARAMETERS AND SETTINGS

TYPE OF LOGONS [REJECTED ➡]

START DATE [10/23/96]   END DATE [10/24/96]

START TIME [1:00 AM]    END TIME [8:30 PM]

OUTPUT TYPE [DISPLAY SCREEN]   MORE..... ➡

FIG. 17

ACTIVITY | REJECTED LOGONS

PERIOD DATE, FROM: 10/23/96  START TIME: 1:00 AM
TO: 10/23/96  END TIME: 8:30 PM

| TIME | DATE | CHNL | ADDR | DST ADDR | USER ID |
|---|---|---|---|---|---|
| 08:31 AM | 10/23 | E03 | 023456 | 345892 | BOB |
| 08:35 AM | 10/23 | E03 | 458962 | 536536 | KTF |
| 08:40 AM | 10/23 | D12 | 023456 | 345892 | BOB |
| 08:42 AM | 10/23 | D10 | 345892 | 023456 | JENNY |
| 08:45 AM | 10/23 | E03 | 023456 | 345892 | BOB |
| 08:48 AM | 10/23 | E03 | 023456 | 345892 | BOB |
| 09:01 AM | 10/23 | E02 | 456901 | 873456 | MARY |
| 09:05 AM | 10/23 | D06 | 876456 | 456901 | FRANK |
| 09:10 AM | 10/23 | D03 | 637899 | 369304 | JACK |
| 09:15 AM | 10/23 | E03 | 023456 | 345892 | BOB |
| 09:18 AM | 10/23 | D03 | 637899 | 369304 | JACK |

...more

FILTER | SEARCH

OPTIONAL ZOOM IN DATA

FIG. 19

NETWORK SECURITY AND SURVEILLANCE SYSTEM

PRIORITY CLAIM

This application claims the benefit of U.S. Provisional Application No. 60/030,446 (of the same title), filed Nov. 6, 1996.

FIELD OF THE INVENTION

The present invention relates to computer networks. More particularly, the present invention relates to network security systems for detecting and protecting against security breaches (both internal and external), network failures, and other types of data-compromising events.

BACKGROUND OF THE INVENTION

A significant problem in the field of computer networks has been the inability to adequately protect private Internet-connected computer networks from security attacks. This problem commonly arises, for example when a company interconnects its internal network (typically a local area network) with the Internet to allow company employees to more easily communicate with outside entities. The benefits of connecting the internal network to the Internet are often significant, including, for example, enabling the company to inexpensively disseminate product information and provide online customer support to potential and existing customers.

As many companies have discovered, however, connecting the internal network to the Internet can have devastating consequences in the absence of an adequate security mechanism. A break-in by a hacker, for example, will often result in the deletion of important data or software files, the introduction of a virus to the network, and/or the public dissemination of confidential information. Less overt break-inns may involve the secret misappropriation of company trade secrets, or the covert manipulation of company data files. Even an innocent act by a company employee, such as the downloading of a virus-ridden file from a Web site, can have devastating effects.

One type of security system which provides limited protection against intrusions is a network firewall system ("firewall"). A firewall is a computer system that restricts the flow of traffic between two networks based on a pre-programmed access control policy. One type of firewall, commonly referred to as a network-level firewall, filters the traffic at the packet level based on the source and destination IP (Internet Protocol) addresses and IP ports of the packets. Another type of firewall masks the internal addresses of the private network, making these addresses appear as firewall addresses. Other firewalls implement elaborate logon and user authentication schemes.

One problem with existing firewall systems is that they are generally only effective at protecting against known types of security attacks. Once a user determines how to circumvent the firewall's access control policy, the firewall offers little or no protection. Although some firewalls generate audit trails of intrusion attempts, these audit trails typically do not reflect the attacks that are actually successful, and are therefore of little value to identifying either the intruder or the method of intrusion. Moreover, even when a successful security attack is recorded within the audit trail, the audit trail will rarely contain the information needed to determine the extent of the damage, let alone restore the network to its pre-intrusion state.

Another problem with existing firewall systems is that they perform little or no virus checking on incoming file transfers, and, even when virus checking is performed, detect only known types of viruses. Yet another problem with firewalls, and with other types of network security systems, is that they do not provide an adequate mechanism for detecting and tracking malicious acts that are performed "on-site" by company employees.

The present invention seeks to overcome these and other deficiencies in existing network security systems.

SUMMARY OF THE INVENTION

The present invention provides a network security and analysis system which includes a variety of features for automatically and interactively monitoring and analyzing traffic on a LAN (local area network), WAN (wide area network), or other type of computer network. In the preferred embodiment, the system is implemented using a general-purpose computer which passively captures and monitors the bi-directional traffic appearing on a network or network segment. The system includes software modules for analyzing the passively-captured traffic in both automatic and interactive (off-line) analysis modes. The system can, but need not, be used in conjunction with a network firewall.

In accordance with one aspect of the invention, the system continuously captures all valid data-link-level packets, and routes this traffic (together with date/time stamps) to a high-capacity, non-volatile data recorder to generate a low-level archival recording. The storage device may, for example, be a high-speed magnetic tape drive. In the preferred embodiment, the system captures and records the packets passively (i.e., in a receive-only mode). Thus, the system does not add latency to the normal flow of traffic on the network, and the system's presence is virtually undetectable by other entities of the network.

In one embodiment, the data-link-level traffic is captured using an off-the-shelf network interface card that connects to the network at a network monitoring point. Through appropriate software, the card is configured to continuously return all bi-directional packet data to the general-purpose host computer at the lowest data interface level supported by the card. In another embodiment, a custom or a modified network interface card is used which enables the system to additionally capture and record packet fragments, collision events, synchronization sequences, and other types of transmission sequences that are typically not accessible when an unmodified off-the-shelf card is used. In yet another embodiment, an analog recorder is used to record the electrical signal present on the network.

An important benefit of the recording process is that the traffic is captured and recorded at the data-link level, which is the lowest-level protocol at which data is transferred as packets. Because the traffic data is recorded at this level (or a lower level), the recordings can subsequently be used to fully-reconstruct and evaluate virtually any type of network transaction that takes place on the network, regardless of the protocol level at which these transactions occur. The archival recordings can therefore be used to perform a wide range of network analysis and restoration tasks, including, for example, restoring lost data files, checking previously-downloaded files for newly-discovered viruses, and performing low-level analyses of network break-ins. The archival recordings are also useful to a variety of network troubleshooting tasks, particularly when a custom or modified network interface card is used that provides access to invalid packet transmissions.

Another benefit of the recording process is that it proceeds continuously, as opposed to being contingent upon the detection of pre-programmed network events. Thus, unlike the event-triggered audit trails generated by many firewall systems, the archival recordings can be used to detect and analyze break-ins and other network anomalies that are not detected at the time of occurrence.

In accordance with another aspect of the invention, the packet stream is optionally encrypted by the system prior to being written to the archival storage medium. Any of a variety of known data encryption methods can be used for this purpose. One benefit of encrypting the packet stream is that it significantly hinders the covert manipulation of the archival recordings by unauthorized users (intruders, company employees, etc.). The archival recordings consequently serve as highly reliable evidence of the events that have taken place on the network, and can be used, for example, as legal proof of user misconduct. Another benefit of encrypting the packet stream is that it protects the privacy of the communications recorded within the archival recordings, and provides for the authentication of the recorded data.

In accordance with another aspect of the invention, the system includes various software and hardware components for allowing an authorized user to analyze the archived traffic data in an "off-line" mode. These components include a data playback unit for replaying archival recordings, a set of traffic analysis databases for storing the archived traffic data during analysis, and a set of post-capture analysis applications. In other embodiments, the off-line analysis functionality is allocated to a separate general-purpose computer.

In operation, the data playback unit is initially used to stage the archived traffic data (or selected portions thereof) to the traffic analysis databases. During this process, user-configurable filters can optionally be invoked to select the types of packets that are loaded into the databases. The analysis applications can then be used to view, analyze and process the traffic data. These applications include functionality for performing such actions as displaying user-specified types of network events, conducting pattern searches of selected packet data, reconstructing transaction sequences, and identifying pre-defined network problems. A lost data recovery application allows the user to reconstruct traffic sequences for subsequent playback onto the network, and can be used, for example, to restore lost data files following a break-in, or to replay an error-causing traffic sequence. Files can also be recovered directly off the recorded data for some protocols, including HTTP (HyperText Transport Protocol) and FTP (File Transfer Protocol).

Another aspect of the invention is a method for recording non-network transactions within the archival recordings. These non-network transactions are events which take place on user computers of the network without a corresponding transmission of data over the network. Examples of such transactions include e-mail messages sent and received using a locally-attached modem, and deletions of locally-stored data files. To enable such transactions to be monitored, a special transaction replication application is provided which runs transparently on one or more user computers. When a non-network transaction of a pre-specified type occurs on a user computer, the replication application encapsulates the transaction (or a representation thereof) using a pre-defined message format, and transmits the encapsulated transaction on the network. This causes the encapsulated transaction to be captured within the archival recording, and allows the transaction to be monitored.

In accordance with another aspect of the invention, the system automatically monitors the passively-captured packet stream in near-real-time to check for a variety of pre-programmed anomalies. In the preferred embodiment, this is accomplished in-part via software which continuously routes at least some of the passively-captured traffic data to a cyclic data recorder. The cyclic data recorder is preferably separate from the data recorder used to generate archival recordings, and is used to temporarily store the traffic data for automated post-capture analysis. When this feature is enabled, a real-time monitoring application reads the traffic data from the cyclic recorder on a first-in-first-out basis and checks for pre-programmed anomalies. Both visual and audible alarms are provided for alerting authorized users when an anomaly is detected. Because the traffic data is analyzed only after being passively captured, thorough analyses (extensive virus checks, reconstruction of transaction sequences, etc.) can be performed without any interruption to the normal flow of data on the network.

In accordance with another aspect of the invention, a configuration option is provided in which the system passively monitors and records the data-link-level traffic appearing on both sides of a commercially-available network firewall. A real-time monitoring application in-turn compares the pre-firewall and post-firewall recordings to identify specific transactions that are rejected by the firewall. In one embodiment, the results of this traffic comparison are automatically compared to a rejection log maintained by the firewall to check for inconsistencies.

BRIEF DESCRIPTION OF THE DRAWINGS

These and other features of the invention will now be described in greater detail with reference to the drawings of certain preferred embodiments, which are intended to illustrate but not limit the invention. In these drawings, reference numbers are re-used, where appropriate, to indicate a correspondence between referenced items.

FIGS. 12–15 depict a sequence of example screen displays which illustrate the operation of an Audit application of the system.

FIGS. 16–19 depict a sequence of example screen displays which illustrate the operation of a Problem Determination application of the system.

DETAILED DESCRIPTION OF PREFERRED EMBODIMENTS

The description of the preferred embodiments is generally arranged within three major sections. In Section I, a preferred process for passively capturing and recording low-level (raw) network traffic data is described. In Section II, a preferred architecture of a network security and surveillance system is described which uses this passive capture/recording process, and which includes various features for facilitating the automated and interactive analysis of the recorded raw traffic data. In Section III, a preferred set of software applications ("analysis applications") is described which provides various features for enabling authorized users to interactively view, analyze and process the recorded traffic data in an "off-line" mode.

I. Passive Capture/Recording Process (FIG. 1)

Figure 1:
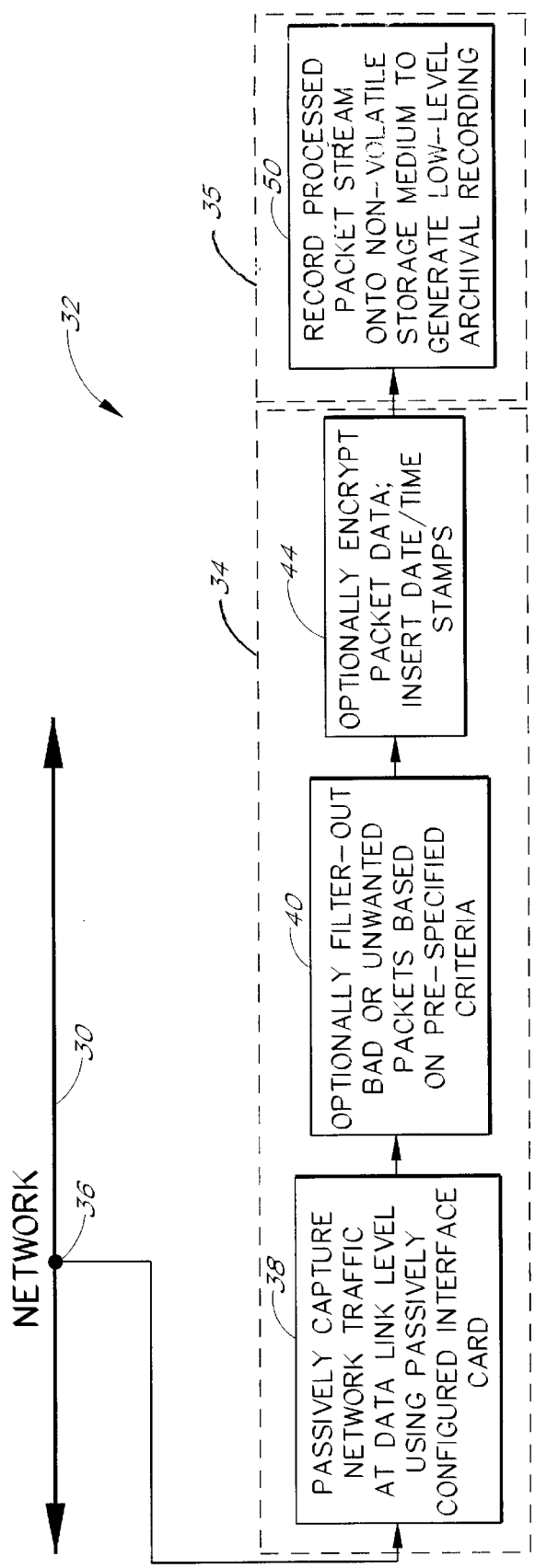
FIG. 1 is a flow diagram which illustrates a preferred process for passively generating a low-level archival recording of network traffic.

FIG. 1 is a high-level diagram illustrating a preferred recording process for passively generating an archival recording of the raw, bi-directional traffic that is present on a computer network 30 or network segment. The process is depicted in FIG. 1 as being performed by a computer system 32 which includes a monitoring computer 34 that is connected to at least one peripheral storage, device 35. As described below, the storage device 35 may, for example, be a magnetic tape drive, a RAID drive, or some other type of high-capacity data recorder that records data onto a non-volatile storage medium. The monitoring computer 34 is connected to the network 30 at a network connection or monitoring point 36.

An important objective of this process is to reliably generate a recording that is of sufficient granularity to enable the subsequent reconstruction of all or virtually all network transactions that can be monitored at the network connection point 36. Another objective is to effectively isolate the recording process from the details of the transactions on the network, so that events taking place on the network cannot inhibit or otherwise alter the recording process. A further objective is to generate an archival recording that cannot easily be interpreted or tampered with by an unauthorized user.

With further reference to FIG. 1, the network 30 may be any type of computer network that carries packetized data, such as a local area network (LAN) based on an Ethernet, token ring, fiber-channel, or other LAN architecture, or a wide area network (WAN) based on an Asynchronous Transfer Mode (ATM), Frame Relay, or other WAN architecture. (The term "packet" is intended to encompass cells, frames, and other message formats used to transfer data across a network.) Connectivity to the network 30 at the network connection point 36 is preferably provided using an off-the-shelf network interface card (not shown) which resides within a host monitoring computer 34. If the system 32 is used to monitor traffic on a link of a WAN, the connection may be established using a packet switch, router or hub of the WAN. As described below, connectively to the network 30 may alternatively be provided using a custom interface card designed in accordance with the principles of the invention.

With reference to block 38 of FIG. 1, the first step of the process involves passively capturing, at the data link level (or a lower level), all network traffic that is present at the network monitoring point 36. This is preferably accomplished by configuring the standard network interface card, via appropriate configuration software, to operate in a purely passive (receive-only) data capture mode in which data-link-layer traffic is continuously routed, without regard to packet content, to the processor(s) of the host computer 34. (As used herein, "data link layer" refers generally to the lowest-level protocol at which data is transferred as packets; an example of a data link layer protocol is Ethernet.)

The data presented at the data link layer generally includes all bit-level data and headers of all packets transferred over the network, and thus includes all of the information needed to fully reconstruct all network transactions. ("Network transactions" are events that involve the transfer of a message, file or other data entity over a network.) Standard network interface cards typically include an interface which corresponds to the data link layer (and thus allows the host computer 34 to access the raw network data packets), with the exception that many of these cards do not provide access to invalid packet data (such as packet fragments that result from collisions or incomplete transmissions).

Because this data capture step takes place passively and without regard to packet content, no traffic pattern or sequence of events on the network 30 can elicit a response from the monitoring computer 34, and the presence of the monitoring computer 34 is virtually undetectable by other computers on the network. As will be appreciated by those skilled in the art, these characteristics make it extremely difficult for an unauthorized user to either detect or alter the recording process from a remote location, and virtually eliminate the possibility of the user accessing the content of the archival recording over the network 30. Another benefit of this data capture process is that it does not delay the throughput of data (i.e., does not add latency) on the network 30, in contrast to existing firewall systems.

With reference to block 40, the packet stream resulting from the passive data capture process is optionally filtered to remove packets which, based on pre-specified criteria, represent invalid or unwanted transmissions and thus have little or no value to the event reconstruction process. Depending on the network type and the surveillance goals sought to be achieved, these "bad" packets may include, for example, packets having a checksum error, packets that have been corrupted by a data collision, and packets addressed to a nonexistent LAN or WAN entity. The general purpose of this step is to reduce the storage burden created by the recordation of the low-level packet data, without significantly inhibiting the ability to use the archival recording to reconstruct valid network transactions. The filtering-out of bad packets can alternatively be performed using filters that pass only selected types of packets.

In the preferred network security and surveillance system described below, a temporary (e.g., 24-hour) record of these filtered-out packets is generated by automatically routing the bad packets to a cyclic recorder. This technique provides a window of time for enabling the bad packets to be evaluated, and/or preserved for subsequent evaluation.

With reference to block 44, the packet stream is then optionally encrypted. Any of a variety of known encryption methods can be used for this purpose, including DES (Data Encryption Standard) and PKCS (Private Key Cryptographic Standard). The encryption of the packet data serves two related goals: (i) it prevents unauthorized users (intruders, company employees, etc.) from strategically modifying the archival recording, so that the recording serves as highly-reliable evidence of the events that have transpired on the network, and (ii) it protects the privacy of the communications represented within the recording. The first of these two goals comes into play when, for example, it is desirable to utilize the recording as proof (in a court of law or otherwise) of user misconduct (e.g., tampering with or stealing confidential data files). As further depicted by block 44, date/time stamps are preferably added to the data stream to facilitate the subsequent reconstruction of network events.

As depicted by block 50, the packet stream which results from the process of blocks 38–44 is written to a non-volatile recording medium (to generate the archival recording) using one or more high-capacity data recording devices. Any of a variety of different types of peripheral recording devices can be used for this purpose, including magnetic tape drives, tape libraries, SLEDs (Single Large Expensive Disks), RAID (Random Array of Inexpensive Disks) drives, optical disk drives, or a combination thereof. In a typical implementation using a magnetic tape drive (such as a Datatape DS-50 50-Mbyte/sec. tape drive available from Datatape Incorporated), the packet data for an entire day will fit on a single cassette. Examples of other specific models of recording devices are provided in the following section.

The archival recording generated by the above-described process is in essence a complete replica of all valid network traffic. The recording contains all valid data-link-level packets (and possibly some or all of the invalid packets), and indicates the time and date that each packet was transferred. The recording thus contains all of the information needed to subsequently reconstruct and analyze any valid transaction or sequence of transactions that has taken place on the network—at any protocol level (e.g., the network level, application level, etc.). As described below, recording network traffic at this level of detail greatly facilitates the after-the-fact detection and tracking of security breaches, and, in many cases, preserves sufficient information to enable the network 30 to be restored to its pre-security-breach state.

When packet filtering is disabled, the archival recordings include additional information that is particularly useful to the troubleshooting of network failures. This information may include, for example, message collisions, incomplete packet transmissions, repetitive transmissions to nonexistent network entities, and the like.

In order to fully utilize the archival recordings to evaluate security breaches and other anomalies, it is desirable to have a flexible set of traffic analysis tools that enable authorized users to interactively view and process the recorded traffic data at the various protocol levels. In accordance with the invention, there is thus provided a set of interactive analysis applications and related program modules that include various functions for facilitating the off-line evaluation of such data. These applications include code for interpreting the traffic data according to the message formats used by a wide range of known protocols and client-server applications. Using these analysis applications in conjunction with an archival recording, an authorized user can, for example, conduct a search for packets that contain particular source and destination addresses, view all HTTP (HyperText Transport Protocol) level messages transmitted during a particular period of time, reconstruct a file transfer or other network transaction, or detect the source of an intermittent transmission to a nonexistent entity. A preferred set of interactive analysis applications is described below in Section III. In addition, a software application and associated method for automatically analyzing the traffic data in near-real-time is described in Section II.

In other embodiments of the FIG. 1 recording process, the passive data capture step represented by block 38 is performed using a custom network interface card which has been designed or modified in accordance with the principles of the invention. In one such embodiment, a modified card is used that provides access to data that would not otherwise be available to the host computer 34. For example, in an Ethernet configuration, a custom Ethernet card can be used that provides access to (i) the synchronization bits that precede a packet transmission, and (ii) the invalid packets and packet fragments that result from collisions. These additional information items are helpful, for example, in isolating and repairing hardware-level problems on the network.

In another embodiment, a network interface card or device is used which simply routes the analog signal appearing on the network cable to an analog tape recording device such as a magnetic tape drive. This produces a recording which, in addition to preserving the raw packet data transmitted at the data link layer, preserves the signaling details of the physical layer. As with the synchronization and collision data, the signaling information can be useful, for example, in troubleshooting hardware-related problems.

Another variation of the data capture process involves using a network interface card having no data transmission circuitry, or having data transmission circuitry that has been disabled via hardware modification. The use of such a card ensures that other entities on the network 30 will not be able to access the contents of the archival recording (assuming no other interface to the network 30 is provided), and ensures that the system will not respond to an interrogation on the network 30.

As will be appreciated by those skilled in the art, the selection of the network connection point 36 can play an important role in determining the types of network events that are captured within the archival recording, particularly in an internetworking environment in which a secure, corporate LAN is connected to a public or semi-public WAN. Archival recordings generated by monitoring WAN-side traffic (i.e., traffic on the WAN side of the LAN-WAN gateway or router) may reflect transactions that would not be captured by LAN-side monitoring, such as failed attacks by unauthorized users. The information captured by such WAN-side monitoring following a break-in may be useful, for example, for identifying the intruder, or for determining the "flaw" in the company firewall that enabled the intruder to gain access. Recordings generated by LAN-side monitoring, on the other hand, will reflect the internal transactions (internal e-mail messages, accesses by employees to internal file servers, etc.) that normally are not detectable via WAN-side monitoring.

II. Network Security and Surveillance System

The architecture of a network security and surveillance system ("the system") which uses the above-described capture/recording process will now be described. In addition to including various hardware and software components for generating low-level, archival recordings of raw network traffic, the system includes various components for automatically analyzing the network traffic in near-real-time. In addition, the system includes a powerful set of analysis tools (described in detail in the following section titled "Analysis Applications and Related Components") for allowing authorized users to perform interactive, off-line analyses of recorded traffic data.

Figure 2:
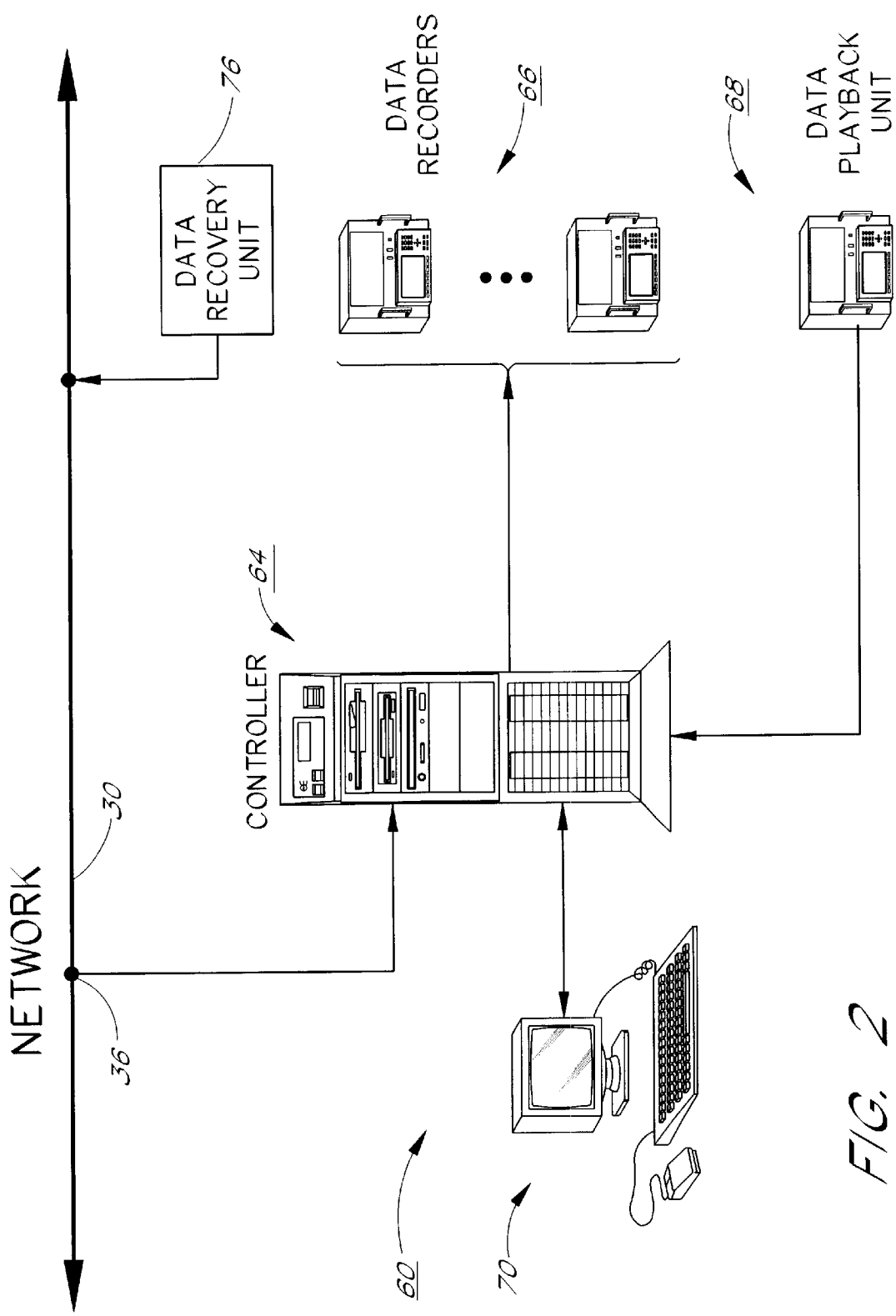
FIG. 2 is a schematic diagram which illustrates the primary hardware components of a network security and surveillance system ("the system") which generates archival recordings according to the process of FIG. 1, and which includes various features for analyzing traffic data in both automated and interactive analysis modes.

(i) Hardware-Level Architecture (FIG. 2) FIG. 2 illustrates the basic hardware components of the network security and surveillance system 60. The system includes a controller 64 that connects to the network 30 using a network interface card (not shown). The controller 64 may, for example, be based on an Intel, DEC Alpha™, SPARC™ or other architecture. In the preferred embodiment described herein, the controller 64 is a general-purpose computer based on the Windows-Intel architecture.

The controller 64 is connected to at least one, and preferably two or more, commercially-available data recorders 66 that record the low-level traffic data. (The terms "traffic data" and "packet data" are used somewhat interchangeably herein to refer generally to the data-link-level traffic of the network.) The system 60 also includes a Data Playback Unit 68 which is used to play back pre-recorded archival recordings for analysis purposes. The data recorders 66 and the Data Playback Unit 68 may be implemented using any of a variety of different types of data recording/playback systems (as discussed below). The data recorders 66 and the Data Playback Unit 68 may be replaced in-whole or in part by one or commercially-available automated tape libraries (not shown). The system 60 further includes a conventional hardware user interface 70 which includes a monitor, keyboard and a mouse.

In the preferred embodiment, the controller 64 includes a passive backplane which has a combination of PCI and ISA standard expansion slots for accepting a processor card (preferably a PCI Pentium™ card) and the various interface cards. (The internal components of the controller 64 are omitted from FIG. 2 to simplify the drawing.) The interface cards include a network interface card which is based on the network technology (Ethernet, token-ring, ATM, etc.) of the particular network 30. In a preferred Ethernet implementation of the system, for example, a 3C590 network interface card from 3COM is used. Additional network interface cards may be provided, for example, for monitoring traffic at a second connection point 36 (as in FIG. 8), and/or for connecting the controller 64 to a separate LAN that is used for administration purposes. One or more storage device interface cards are provided for interfacing the controller 64 to the data recorders 66. For example, one or more LP-400 interface cards may be provided for interfacing the controller to one or more Datatape LP-400 tape drives.

With further reference to FIG. 2, the data recorders 66 are high capacity data storage devices that are used to record the low-level traffic data and the associated time/date stamp data. The architecture of the system 60 supports a variety of different types and models of recording devices. Examples of commercially-available data recorders that can be used include the Datatape DS-50 tape drive (50 Mbytes/sec.), the IBM 3590 ½" tape drive (9 Mbytes/sec.), the DTR48 tape drive (6 Mbytes/sec.), and the Ciprico Disk RAID (70 Mbytes/sec.). A combination of different types of data recorders can be used in a single implementation of the system 60.

The types and models of data recorders 66 that can be used in a given network environment depend upon the maximum transfer rate of the particular network. Tape drives with recording speeds of up to 50 Mbytes per second are available for medium to large networks. Higher recording speeds can be obtained by tape striping, and/or by interleaving the traffic data across several tape drives at a time. As described below, at least one of the data recorders 66 is preferably configured as a cyclic data recorder which continuously stores data onto a single medium to create a temporary recording of the traffic data, while another one or more data recorders 66 are operated as an "archival media unit" which stores the traffic data on a write-once basis to generate archival (permanent or semi-permanent) recordings that are preserved for later use.

The Data Playback Unit 68 is a dedicated peripheral device that is used to play back previously-recorded archival recordings for analysis of the traffic sequences represented therein. The type and model of the playback unit 68 is generally dictated by the type and model of data recorder 66 used to generate the archival recordings. As described below, the output of the Data Playback Unit 68 is used by the controller 64 to populate one or more traffic analysis databases 96 (FIG. 3), which may, for example, reside on an internal hard disk of the controller 64. The traffic analysis databases are in-turn used for generating reports, conducting pattern searches, reconstructing transaction sequences, and performing other types of interactive analysis functions.

As indicated above, the data recorders 66 and the Data Playback Unit can be replaced in-whole or in-part by one or more automated tape libraries ("tape library"). Examples of commercially-available tape libraries that can be used include the Grau AML/J ATL (low end), the Grau AML/E ATL (medium), the Grau AML/2 ATL (high end), and the Breece Hill DLT7000 (with or without tape striping). The use of a tape library provides various benefits over single-cassette recording devices, including reducing the burden associated with replacing the archival tapes as they become full, and reducing the burden associated with locating and loading previously-recorded tapes for playback.

With further reference to FIG. 2, the system 60 also includes an optional Data Recovery Unit 76. This unit 76 connects to the network 30 via a separate network interface card (not shown) from the card used by the controller 64 to capture the traffic data. The purpose of the Data Recovery Unit 76 is to play back pre-recorded traffic sequences onto the network 30 in order to, for example, restore lost data on the network 30, or recreate a traffic scenario that previously caused an error. These pre-recorded traffic sequences are preferably generated from archival traffic recordings, under the control of the user, using special interactive analysis applications. As described below, one of the data recorders 66 (designated as the Data Recovery Recorder 86 in FIG. 3) is preferably dedicated to this function.

In the preferred embodiment, the Data Recovery Unit 76 is implemented as a dedicated general-purpose computer (not shown) which connects to the network 30 and tape player (or other peripheral play-back device) via respective interface cards. In another embodiment, the Data Recovery Unit 76 is implemented using a dedicated network interface card within the controller 64. The use of a separate general-purpose computer has the advantage of protecting the controller 64 from being detected or tampered with via the network 30. The operation of the Data Recovery Unit 76 and the Data Recovery Recorder 86 are further described below.

Figure 3:
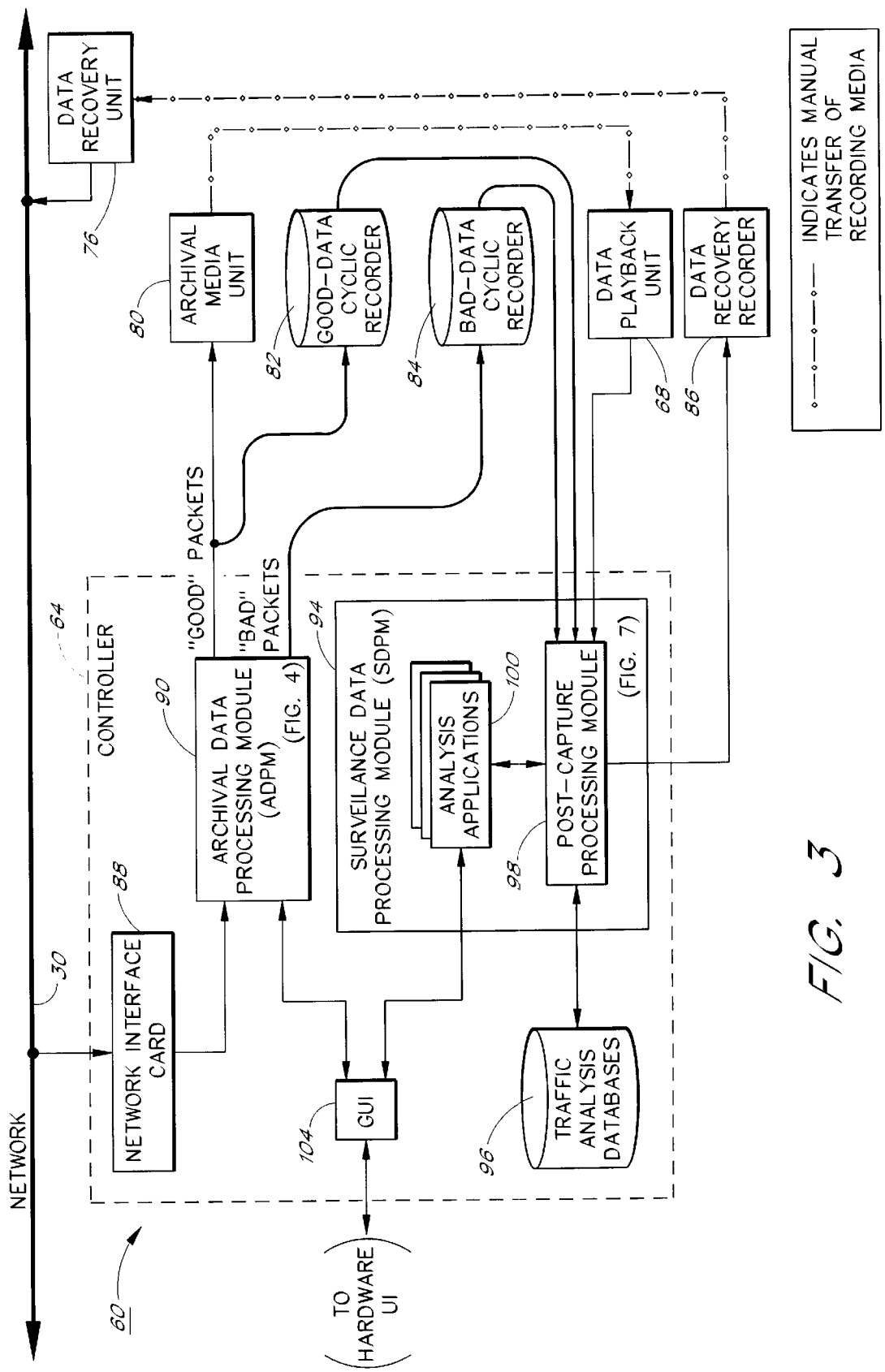
FIG. 3 is an architectural drawing of the system.

(ii) Software/functional Architecture (FIG. 3)

Three general types of software components run on the controller 64 for the purpose of processing traffic data. The first type are the traffic capture components which run continuously in the background to passively generate a data stream that represents the traffic present on the network 30; the functions performed by these components include filtering and encrypting the incoming packet stream, and inserting date/time stamps into the packet stream. The second type are the automated traffic monitoring components; these components passively monitor the passively-captured packet stream in near-real-time, based on pre-specified criteria, to monitor for security attacks, viruses, and other anomalies. The third type are the interactive analysis applications (discussed in Section III), which are selectively launched by the user, as needed, to perform customized, off-line analyses of pre-recorded traffic data.

In the preferred embodiment, most of these software components are configured to run under the Microsoft Windows NT operating system (and other operating systems). The software components make use of a graphical user interface 104 (FIG. 3), such as the Network Peripheral Adapters (NPA) graphical user interface of Datatape Incorporated or a suitable HTML-based interface. From this graphical user interface (and the hardware user interface 70), the user can modify various program parameters to control the automated monitoring and passive capture/recording processes.

The overall functional architecture of the system 60 will now be described with reference to FIG. 3, which illustrates the general flow of data between the various functional components of the system. As will be apparent from the description, some of the functional blocks shown in this figure and the subsequent figures correspond to respective combinations of hardware, software and firmware components.

As illustrated by FIG. 3, the controller 64 is coupled to four data recording units: an Archival Media Unit 80, a Good-Data Cyclic Recorder 82, a Bad-Data Cyclic Recorder 84, and an Data Recovery Recorder 86. The controller 64 is also coupled to the Data Playback Unit 68 which, as indicated above, is used to play back pre-recorded traffic sequences for off-line (interactive) analysis.

The Archival Media Unit 80 is a storage unit that is used to generate archival recordings of the low-level traffic data. (The term "archival" is used herein to indicate the permanent or semi-permanent nature of the recordings, in contrast to the temporary recordings generated by the cyclic recorders 82, 84.) In one embodiment, the Archival Media Unit 80 is implemented as a group (two or more) of the data recorders 66 of FIG. 2, in combination with handler software (running on the controller 64) which automatically switches (i.e., re-routes the archival data stream) between the individual recorders as the tapes or other archival storage media become full. In other embodiments, the Archival Media Unit 80 is implemented as an automated tape library, which may be either dedicated to the archival recording process or used for both recording an playback.

Each of the cyclic recorders 82, 84 corresponds, respectively, to a dedicated data recorder 66 (preferably a single hard disk or a RAID array) configured to record data cyclically. As described below, these recorders 82, 84 are used to generate temporary records of the raw network traffic data to enable the controller 64 to passively monitor the network 30 using automated monitoring software. As will be recognized by one skilled in the art, one or both of the cyclic recorders 82, 84 can alternatively be implemented in-whole or in-part within the random access memory of the controller 64.

The Data Recovery Unit 86 preferably corresponds to a single, dedicated data recorder 66 (FIG. 2). As described below, this unit 86 is used to record userspecified traffic patterns for subsequent replay (via the data replay unit 76) onto the network 30.

As further depicted by FIG. 3, the controller 64 is connected to the network 30 via a network interface card 88 which, as indicated above, may be either an off-the-shelf card or a custom card. In addition, the controller includes two primary software modules—an Archival Data Processing Module (ADPM) 90 and a Surveillance Data Processing Module (SDPM) 94. In a preferred implementation, both processing modules 90, 94 are based on the CORBA (Common Object Request Brokering Architecture) standard. The Surveillance Data Processing Module 94 is interfaced to one or more traffic analysis databases 96. As described below, the traffic analysis databases 96 are used to store and process traffic data read-in from the Data Playback Unit 68 and/or the cyclic recorders 82, 84.

The Archival Data Processing Module 90 is a real-time data processing module which continuously receives raw traffic data from the network interface card 88, and processes the data according to the method generally depicted by FIG. 1. The real-time functions performed by the Archival Data Processing Module 90 include packet filtering (when enabled), encryption (when enabled), and date/time stamp insertion. These functions are implemented via software routines which run in the background on the main microprocessor of the controller 64. In other embodiments, some or all of these functions may be performed by dedicated hardware. The Archival Data Processing Module 90 also includes code for automatically switching over from one data recorder to another as Archival Media Unit recording media (e.g., tape cassettes) become full, and for alerting authorized users when the recording media need to be manually replaced.

During normal operation, the archival data stream generated by the Archival Data Processing Module 90 is routed to the Archival Media Unit 80 for archival storage, and is also routed to the Good-Data Cyclic Recorder 82 to enable the automated analysis of such data by the Surveillance Data Processing Module 94. When packet filtering is enabled, the filtered-out or "bad" packets are optionally routed to the Bad-Data Cyclic Recorder 84 to enable automated analysis thereof by the Surveillance Data Processing Module 94. The operation of the Archival Data Processing Module 90 is further described below under the heading "Archival Data Processing Module."

With further reference to FIG. 3, the Surveillance Data Processing Module 94 is a post-recordation processing module which receives and analyzes traffic data read-in from three different sources: the Data Playback Unit 68, the Good-Data Cyclic Recorder 82, and the Bad-Data Cyclic Recorder 84. The primary components of the Surveillance Data Processing Module 94 are (i) a Post-Capture Processing Module 98 which includes various software routines for monitoring, filtering, searching and manipulating traffic data, and (ii) the above-mentioned interactive analysis applications 100 which provide functionality for allowing users to interactively analyze and process traffic data in an "off-line" mode. In one embodiment, the software routines of the Surveillance Data Processing Module 94 run on the same microprocessor as those of the Archival Data Processing Module 90. In another embodiment, the controller 64 is provided with two microprocessors (each of which may be provided on a respective processor card)—one which runs the Archival Data Processing Module 90 software, and the other which runs the Surveillance Data Processing Module 94 software. In yet another embodiment, the functionality of the Archival Data Processing Module 90 and the Surveillance Data Processing Module 94 is partitioned between two separate general-purpose computers.

As discussed in greater detail below, the Surveillance Data Processing Module (SDPM) 94 performs two primary functions. The first function is the automated monitoring of raw network traffic data. This is accomplished via an Automated Monitor application 140 (FIG. 7) which uses pre-specified criteria to analyze data read in from the Good-Data Cyclic Recorder 82 and/or the Bad-Data Cyclic Recorder 84. The general purpose of this function, when enabled, is to automatically detect security breaches, inbound viruses, and other anomalies during or shortly after (e.g., within several minutes or hours) of occurrence. Audible and visual alarms are provided to alert personnel of the detection of such events. (A display screen showing one visual alarm format is depicted in FIG. 17.) Alarms which use paging, email and/or telephone notification mechanisms may also be provided. Because a passively-captured replica of the network traffic is used to perform the automated analysis, no latency is introduced to the network 30.

The second function of the Surveillance Data Processing Module 94 is to enable authorized users to interactively analyze and manipulate pre-recorded traffic data through a set of powerful analysis tools. This function is accomplished through the analysis applications 100, which include functionality for performing such actions as displaying user-specified types of network events, conducting pattern searches of selected packet data, reconstructing transaction sequences, and identifying pre-defined network problems. These applications 100 also allow the user to generate a custom traffic sequence from pre-recorded traffic data, and to output the sequence to the Data Recovery Recorder 86; the tape or other recording medium can then be transferred to the Data Recovery Unit 76 and replayed onto the network 30. This feature can be used, for example, to restore lost data, or to recreate an error-causing scenario.

With further reference to FIG. 3, the Post-Capture Processing Module 98 serves in-part as an interface to the traffic analysis databases 96. These databases are used by the analysis applications 100 to store and manipulate selected portions of traffic data. In operation, archived traffic data is loaded into the traffic analysis databases 96 from the Data Playback Unit 68. Traffic data can also be loaded into the databases 96 from either of the cyclic recorders 82, 84. As the raw traffic data is read-in by the controller 64, the Post-Capture Processing Module 98 decrypts the data (if the data is encrypted), and filters-out packets based on user-specified criteria; in addition, to facilitate the subsequent analysis of the data, the Post-Capture Processing Module 98 processes the packets based on protocol-specific packet fields to build various transaction data structures and records that represent the various application and user transactions. The Post-Capture Processing Module 98 is described in further detail below.

As further depicted by FIG. 3, the Archival Data Processing Module 90 and the Surveillance Data Processing Module 94 share a common graphical user interface (GUI) 104. Through this interface, the user can launch and control the various analysis applications 100 through a common set of menus and controls. The user can also modify various program parameters that control the automated operation of the Archival Data Processing Module 90 and the Surveillance Data Processing Module 94. For example, the user can modify the operation of the Archival Data Processing Module 90 by enabling/disabling packet filtering, enabling/disabling encryption, and modifying packet filtering criteria; and can modify the operation of the Surveillance Data Processing Unit 94 by enabling/disabling automated monitoring, enabling/disabling filtering, modifying filtering criteria, and modifying various alarm settings.

In a typical installation, the system 60 resides in a secure area of a corporation or other organization, where it passively and continuously records the data-link level traffic without interfering with the normal flow of traffic. The system may, but need not, be used in conjunction with a network firewall, and as indicated above, may be connected on the LAN side or the WAN side (or both) of a LAN-WAN interface.

In operation with encryption enabled, all valid packets appearing on the network or network segment 30 are received by the network interface card 88 and passed to the Archival Data Processing Module 90. When packet filtering is enabled, the Archival Data Processing Module 90 routes the good packets to the Archival Media Unit 80 (in encrypted form) and to the Good-Data Cyclic Recorder 82 (in either encrypted or unencrypted form); the bad packets are routed to the Bad-Data Cyclic Recorder 84, or, if bad packet recording is disabled, are discarded. When packet filtering is disabled, all packets are routed to the Archival Media Unit 80 and the Good-Data Cyclic Recorder 82, and no data is routed to the Bad-Data Cyclic Recorder 84. The Archival Media Unit 80, Good-Data Cyclic Recorder 82 and Bad-Data Cyclic Recorder 84 record all of the data they receive from the Archival Data Processing Module 90.

Unlike the Good-Data Cyclic Recorder 82 and Bad-Data Cyclic Recorder 84, the Archival Media Unit 80 functions, via software control, as either a write-once read-many (WORM) storage device or a write-once write-only storage device. In either case, no modifications to the raw traffic data (and associated time/date stamp data) recorded by the Archival Media Unit 80 can be made from the controller 64. When tape is used as the recording medium for the Archival Media Unit 80, the tape drive is advanced only when actual traffic data is being recorded. Thus, no "blank" periods appear on the archival tapes as the result of inactivity on the network 30. As discussed below, the original timing of the incoming packet stream is nevertheless preserved by inserting the date/time stamps into the packet stream.

As the tapes or other recording media of the Archival Media Unit 80 are filled with raw traffic data (and associated time/date stamps), they are manually removed from the Archival Media Unit 80 and stored away (preferably in a secure location) for later use. These archival recordings can subsequently be loaded into the traffic analysis databases 96 via the Data Playback Unit 68 as needed (such as when a security breach is detected or suspected) for evaluation via the analysis applications 100. Because the archived data is stored on the recording media in an encrypted form (when encryption is enabled), the risk of the data being modified without detection is minimal.

As indicated above, the Good-Data Cyclic Recorder 82 and the Bad-Data Cyclic Recorder 84 provide a temporary record of the good and bad packet data (respectively), and are used to enable the system 60 to automatically monitor the traffic in near real-time. Depending upon the speed of the network 30 and the capacity of the storage media, the cyclic recorders 82, 84 can typically store about 24 hours of continuous traffic data. When automated monitoring is enabled, the software routines of the Post-Capture Processing Module 98 automatically read-in and analyze the data from the Good-Data Cyclic Recorder 82 and/or the Bad-Data Cyclic Recorder 84 as or shortly after it is recorded. Any of a variety of known security checks can be performed on the packet data at this stage. For example, virus checking can be performed on all incoming FTP (File Transfer Protocol) and HTTP files from unknown sites. Other examples include monitoring source addresses to detect incoming packets from sources known to be a threat, and inspecting email messages for attached files. Because the traffic data is analyzed only after being passively captured, thorough analyses (extensive virus checks, reconstruction of transaction sequences, etc.) can be performed without any interruption to the normal flow of data on the network.

Figure 8:
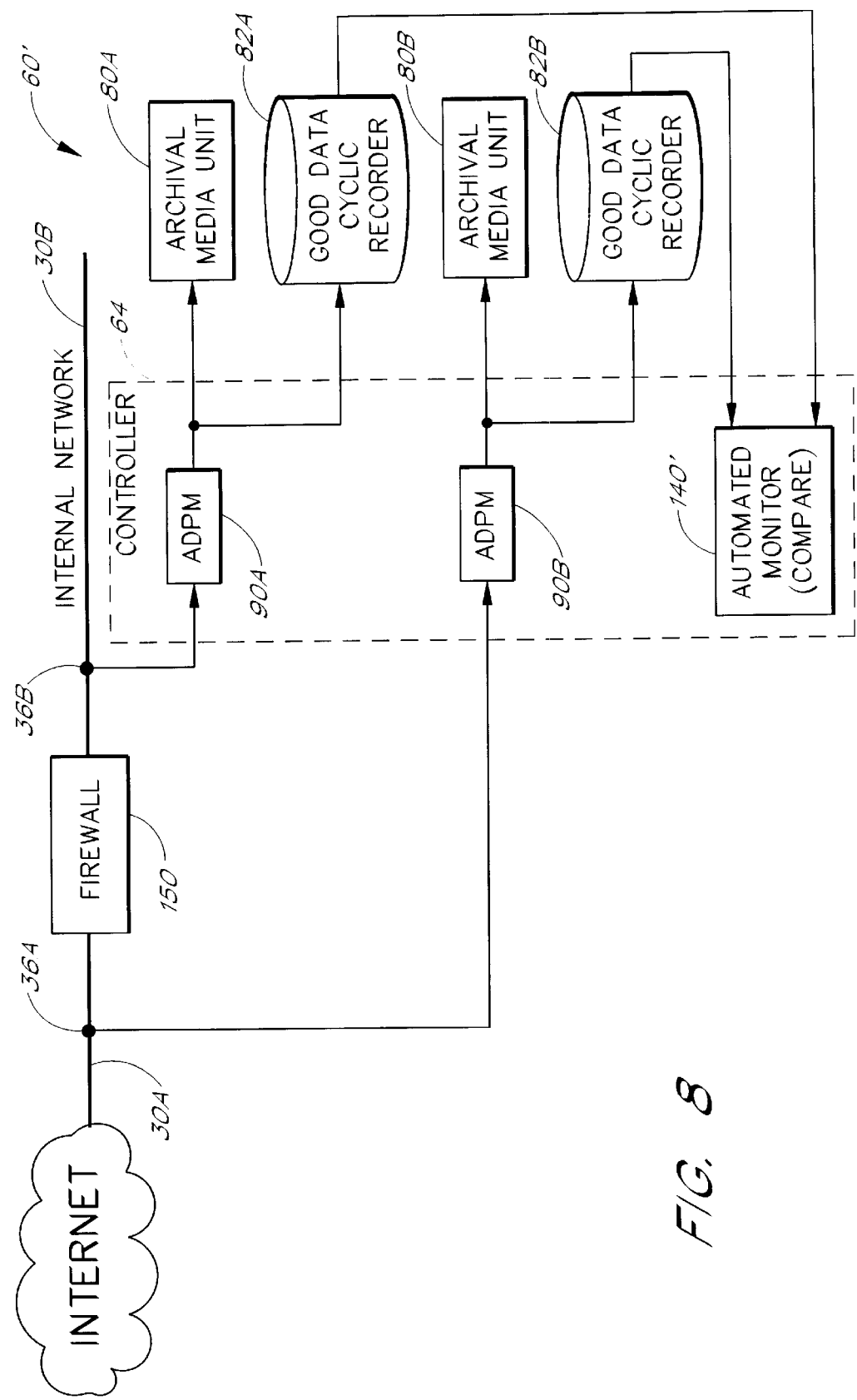
FIG. 8 illustrates a connection/configuration option in which the system is used to record and compare pre-firewall and post-firewall traffic.

As will be appreciated from the foregoing, the various architectural components of the system 60 can be duplicated, omitted or moved to a separate general-purpose computer to produce a customized system that is tailored to specific monitoring needs. For example, one or both of the cyclic data recorders 82, 84 (and related software components) can be omitted to produce a system that provides limited or no automated analysis functionality. Another configuration option involves outfitting a single controller 64 with multiple network interface cards 88, Archival Data Processing Modules 90 and Archival Media Units 80 to enable the controller to simultaneous monitor traffic at multiple different connection points 36 (of either the same network or different networks). (An example configuration in which the controller 64 concurrently monitors two network connection points 36A, 36B is illustrated in FIG. 8 and described below.) Another configuration option involves allocating some or all of the post-capture analysis functionality to a separate general-purpose computer, which may, for example, be linked to the controller 64 by a separate LAN connection.

Figure 4:
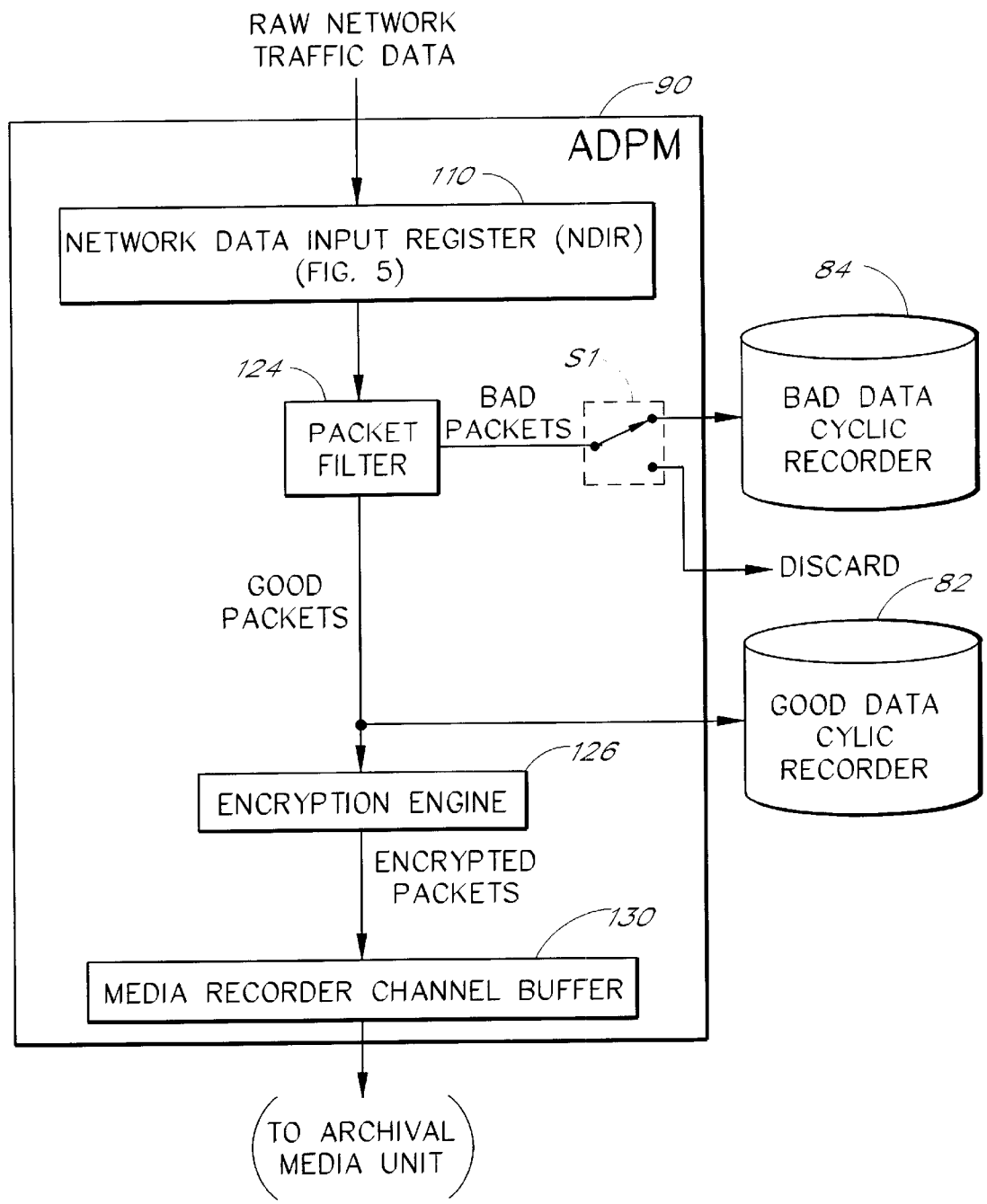
FIG. 4 illustrates the primary components of the Archival Data Processing Module (ADPM) of FIG. 3, and illustrates the flow of traffic data between the ADPM components and related system components.
Figure 5:
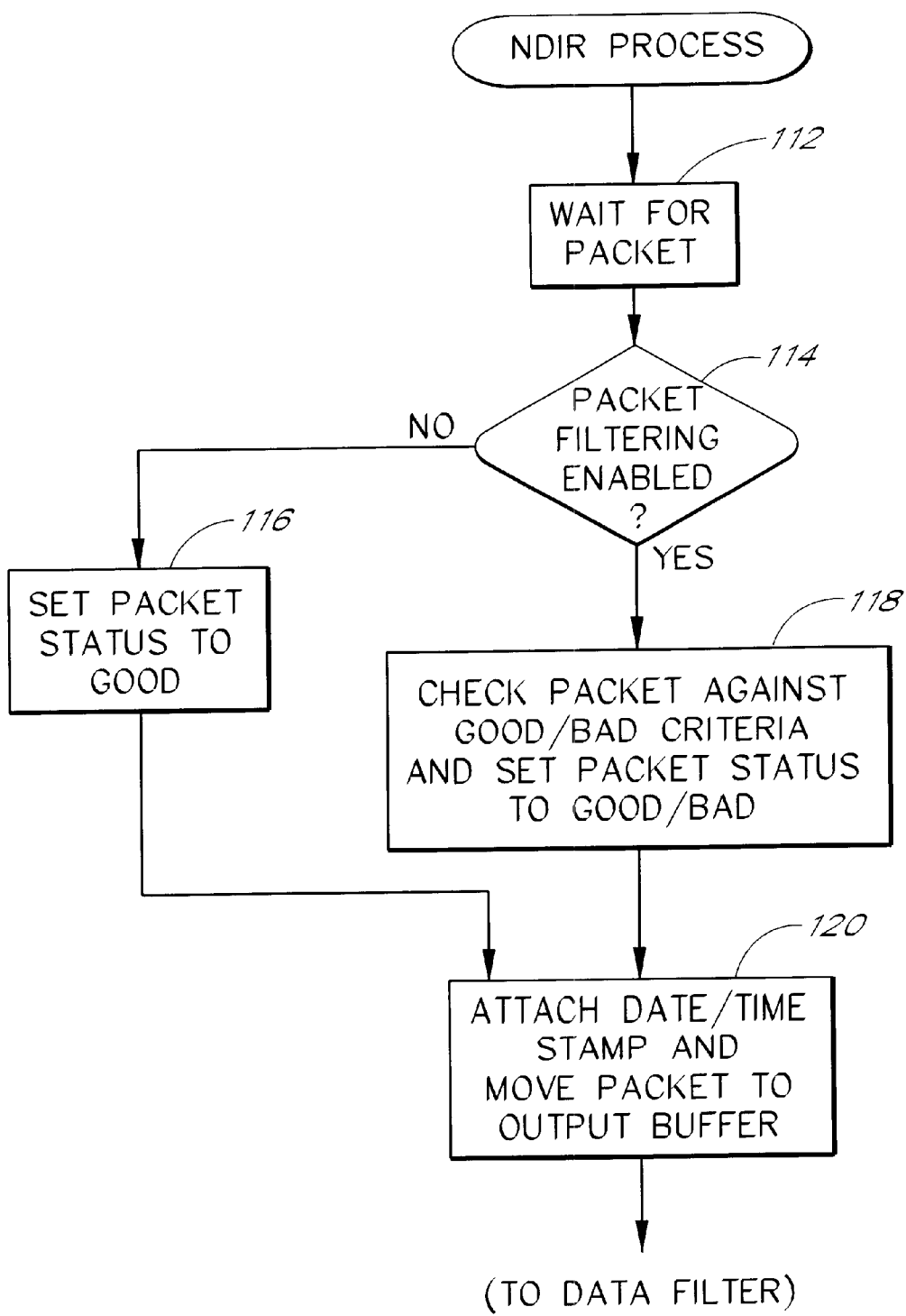
FIG. 5 illustrates a software process implemented by the Network Data Input Register (NDIR) module of FIG. 4.
Figures 6A, 6B:
FIGS. 6(a) and (b) illustrate respective formats for storing traffic data on archival and cyclical storage media of the system.

(iii) Archival Data Processing Module (FIGS. 4–6)

FIG. 4 illustrates the primary software components of the Archival Data Processing Module 90, and illustrates the flow of traffic data between these components during normal operation. The raw network traffic data received by the network interface card 88 (FIG. 3) is initially processed by a Network Data Input Register (NDIR) module 110. This data is in the form of raw data packets. The length (number of bits) and format of these packets depend upon the type of the network 30 (Ethernet, ATM, SONET, etc.).

FIG. 5 illustrates the basic process continuously implemented by the NDIR module 110. As depicted by blocks 112-118, the NDIR module runs in a continuous loop in which it waits for a packet to arrive (block 112), and then sets a corresponding packet status flag to either GOOD or BAD (blocks 114–118). Depending on the type of network interface card used, the step of waiting for the next packet (block 112) may involve determining whether a received block of data is electronically in the form of a packet structure. If packet filtering is disabled, the packet status flag of each packet is set to GOOD (block 116) regardless of the content of the packet. If, on the other hand, packet filtering is enabled, the content of the packet is evaluated against pre-specified criteria to determine whether it should be flagged as GOOD or BAD, and the flag is set accordingly (block 118). A packet may be flagged as BAD, for example, if it is addressed to an invalid LAN address. As depicted by block 120, once the status flag has been set, the packet is date/time stamped and written to an output buffer. The date/time stamps reflect the dates and times that the packets are transmitted on the network 30, and thus preserve the details of the original timing of the traffic on the network.

With further reference to FIG. 4, the packets are then processed by a packet filter module 124 ("packet filter") which separates the good packets from the bad or unwanted packets based on the respective packet status flags of the packets. As schematically represented by the software-controlled switch S1 in FIG. 4, the bad packets (if any) and associated date/time stamps are either routed to the Bad-Data Cyclic Recorder 84 or discarded, depending on whether the bad data recordation feature is enabled. The good packets (and associated time/date stamps) are routed to the encryption engine 126. The good packets are also routed to the Good-Data Cyclic Recorder 82, either in unencrypted form (as depicted in FIG. 4) or following encryption by the encryption engine 126.

The encryption engine 126 applies an appropriate encryption algorithm to the good packet data, preferably on a packet-by-packet basis. In one implementation of the system 60, the encryption engine 126 uses the DES (Data Encryption Standard) algorithm, which is a block cipher algorithm that uses a 56-bit secret key to encrypt 64-bit blocks of data. A decryption engine (142 in FIG. 7) within the Post-Capture Processing Module 98 (FIG. 3) uses this same 56-bit key to decrypt the packet data when subsequently read-in for analysis. As will be appreciated by one skilled in the art, any of a variety of other cryptographic methods can be used to encrypt/decrypt the packet data. For example, the public key cryptography methods developed by RSA Laboratories can be used, in which case different keys will be used for encryption and decryption. Public key cryptography, DES, and other suitable cryptographic methods are described in Stallings, Network and Internetwork Security, Prentice-Hall, Inc., 1995. In the preferred embodiment, the encryption engine is a software module which runs on the main processor of the controller 64. In other embodiments, encryption and decryption may be handled by a dedicated encryption/decryption co-processor.

As further depicted by FIG. 5, the archival data stream (comprising encrypted packets and date/time stamps) which results from the above process is written to a media recorder channel buffer 130, which buffers the data as it is recorded by the Archival Media Unit 80. During this recording process, handler software (not shown) running on the controller 64 monitors the standard status signals that are returned by the Archival Media Unit's data recorders 66 (FIG. 2) and/or automated tape library. When a tape cassette or other removable storage device of the Archival Media Unit 80 becomes full, the handler software automatically re-routes the outgoing data stream to a fresh storage device, such as by routing the data stream to a different data recorder 66. The handler software also alerts an authorized user whenever manual intervention is needed, such as when new tape cassettes need to be loaded into the data recorders 66 or tape library of the Archival Media Unit 80.

FIG. 6(*a*) illustrates, for one implementation of the Archival Data Processing Module 90, the format used for recording the archival data stream to a tape or other storage medium of the Archival Media Unit 80. The recording begins with a start-of-media marker, followed by a media header. The media header may include, for example, an identifier of the network 30 from which the recording was generated, and an identifier of an authorized user that was logged into the system 60 when the recording was initiated. The media header is followed by a chronological sequence of the encrypted (or unencrypted) packets and their respective date/time stamps, followed by an end-of-media marker.

FIG. 6(*b*) illustrates a corresponding format used for storing the data stream to the Good-Data Cyclic Recorder 82. The same format may also be used for storing traffic data to the Bad-Data Cyclic Recorder 84. As illustrated, the cyclic recording format is similar to the Archival Media Unit 80 recording format, with the exception that the start-of-media, media header, and end-of-media fields are omitted. As represented by the arrow in the drawing, the recorded data is overwritten on a circular basis (i.e., the oldest data is overwritten first).

Figure 7:
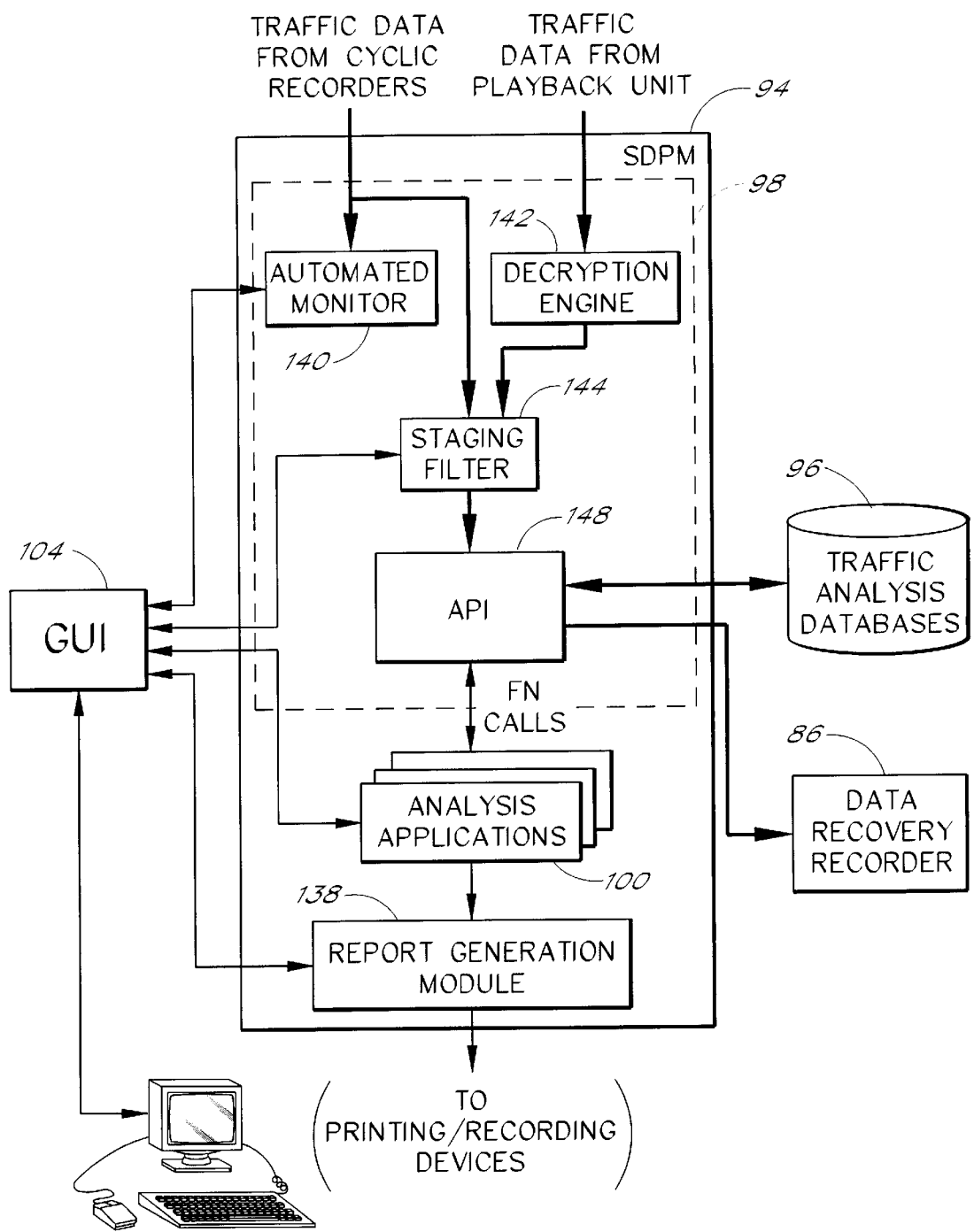
FIG. 7 illustrates the primary components of the Surveillance Data Processing Module (SDPM) of FIG. 3, and illustrates the flow of data between the SDPM components and other system components during normal operation.

(iv) Surveillance Data Processing Module (FIG. 7) FIG. 7 illustrates the primary software components of the Surveillance Data Processing Module 94, and illustrates the flow of traffic and control information between these components. Flow paths that are primarily used for the transfer of raw (encrypted or unencrypted) traffic data (including associated time/date stamp data) are shown in dark lines. As depicted by the drawing, the Surveillance Data Processing Module 94 includes the Post-Capture Processing Module 98, the interactive analysis applications 100, and a Report Generation Module 138. The Post-Capture Processing Module 98 includes an Automated Monitor application 140 ("Automated Monitor"), a decryption engine 142, a staging filter 144, and an application program interface (API) 148 that controls the operation of the analysis applications 100.

During normal operation of the system with automated monitoring enabled, the pre-recorded raw traffic data is continuously and sequentially read-in from one or both of the cyclic recorders 80, 84 (depending upon the configuration settings) and analyzed by the Automated Monitor 140. In this regard, the cyclic data recorders 82, 84 act generally as first-in-first-out buffers for storing the raw traffic data until the Automated Monitor 140 is available to process the data. The read-in data is thus a near-real-time representation of the events taking place on the network 30.

The Automated Monitor application 140 uses known data processing techniques (virus checking, transaction monitoring, etc.) to automatically check for and track suspect network events. In one configuration option, the Automated Monitor 140 checks all inbound transfers of executable files for known viruses. By selecting an ALERT MONITOR menu option on the graphical user interface 104, the user can enable and disable various visual and audible event alarms. For example, the user can configure the Automated Monitor 140 to trigger an audible or visual alarm upon detecting a virus in an inbound file transfer. The Automated Monitor 140 can also be configured to alert the user when critical limits are exceeded on the network 30, such as when the network becomes saturated. In addition, the Automated Monitor 140 can be configured to generate a log file of specific types of events, such as unsuccessful logon attempts. In one mode of operation, the Automated Monitor 140 runs continuously in the background, allowing the user to run the analysis applications and perform other interactive actions in the foreground.

As indicated above, the analysis applications 100 provide various functionality for allowing users to interactively perform non-real-time or "off-line" analyses of pre-recorded raw traffic data read-in from the Data Playback Unit 68 and the cyclic recorders 82, 84. Using a set of menu options of the analysis applications 100, the user can specify the source of the pre-recorded data and the time segment of traffic data to be read-in, and can enter a password or decryption key for enabling the decryption of any traffic data stored in an encrypted form. This data is then loaded into the traffic analysis databases 96 for off-line processing. The traffic data can also be routed directly to the analysis applications 100.

Briefly, as the raw traffic data is read-in from the Data Playback Unit 68 and/or the cyclic recorders 82, 84, it is processed by the staging filter 144 and the API 148. Data read-in from the playback unit 68 is additionally processed by the decryption engine 142 to restore the data to its unencrypted state. The filtered traffic data is then parsed and interpreted by the API 148 to identify the underlying network transactions, which are in-turn recorded within an appropriate database 96 (and/or routed directly to the analysis applications 100) with the associated raw data. With further reference to FIG. 7, the staging filter 144 is a user-configurable filter, adjustable via the GUI 104, which allows the user to specify the type or types of transactions that are loaded into the databases 96 and/or routed directly to the analysis applications 100. The types of filtering parameters that can be set by the user include the following: (a) network address (source and destination), (b) traffic type, (c) packet type, (d) user ID, (e) field ID, and (f) packet transaction sequence. By specifying appropriate combinations of the filtering parameters, the user can, for example, load the databases 96 with all FTP traffic, or with all SMTP (Simple Mail Transfer Protocol) transactions (including payload messages and attached files), that were transmitted during a particular window of time. This feature of the system allows the user to efficiently focus-in on the traffic events of interest.

The API 148 acts in-part a software interface between the analysis applications 100, the traffic analysis databases 96, and the play-back devices 68, 82, 84. Included within the API are a set of callable API functions or "utilities" that provide the basic functionality for allowing the applications 100 to reconstruct network events and transactions at various protocol and application levels, and for allowing the applications 100 to group together the events and transactions based on various criteria. Using these API functions, the applications 100 can interpret the raw traffic data to extract transaction details that are specific to particular protocol layers and/or client-server applications. For example, the applications 100 can call an HTTP interpreter utility to display a web page or other HTTP-level transaction that appears within a sequence of raw traffic data.

Also implemented by the API is a powerful search engine which allows the user, via the analysis applications 100, to initiate searches of the traffic data at various levels of resolution. The search engine supports searches of all database fields (including field+pattern searches), and provides a "zoom" feature which allows the user to interactively "zoom-in" on areas of interest to expose additional levels of detail. Using this feature, the user can, for example, view the textual content and embedded images of an HTML or other standard-format document. In a typical searching scenario, the analysis may initially involve a search for all packets containing a particular set of source and destination addresses, or for all packets transmitted during a particular time window. The contents of the packets uncovered by this initial search may then be searched for a particular pattern or keyword. The user may then zoom-in on a particular packet to view specific packet or transaction details. The API 148 also includes software utilities for initiating reads of traffic data from the playback unit 68 and the cyclic recorders 82, 84, and includes utilities for writing data to the Data Recovery Unit 86. In addition, the API includes utilities for building data structures and transaction records which represent traffic content at various levels of detail.

An important benefit of the API is that it allows the applications to share a basic set of utilities for accessing and manipulating the databases 96, and for accessing the various peripheral devices. This in-turn provides for a high degree of code efficiency by allowing significant amounts of code to be re-used. Another benefit of the API is that it facilitates the creation and addition of new analysis applications, making the Surveillance Data Processing Module 94 highly extensible.

With further reference to FIG. 7, the Report Generation Module 138 includes object class libraries for allowing the user to select between a variety of display formats, including various graphs, lists, and tables for the display of report data from the analysis applications 100. In operation, data is staged by the analysis applications 100 and transferred to the Report Generation Module 138. The Report Generation Module then manipulates the data to match a format preselected by the user. The formatted data can then be delivered to a printer or display, or can be saved to a file.

(v) Multiple Monitoring Points (FIG. 8)

As will be appreciated by those skilled in the art, the configuration of the system 60 with respect to the network 30 can be varied to meet a variety of security and surveillance needs. FIG. 8 illustrates one such configuration in which a single system 60' is used to monitor both pre-firewall and post firewall traffic. As depicted by the drawing, the Archival Data Processing Module (ADPM) is replicated on the controller 64 such that one ADPM 90A processes traffic on the Internet side of a conventional firewall 150, while the other ADPM 90B processes traffic on the internal-network side of the firewall 150. Each ADPM 90A, 90B passively receives traffic data from a different respective network interface card (not shown), and forwards the processed raw traffic data to a respective Archival Media Unit/Good-data Cyclic Recorder pair. The two ADPMs 90A, 90B can, but need not, be allocated to respective processor cards of the controller 64.

One benefit of this configuration is that the combination of the pre-firewall and post-firewall recordings represents all traffic entering and exiting the firewall. A comparison of these recordings can thus be performed to evaluate the effectiveness of the firewall 150. In the preferred embodiment, this comparison is performed automatically in near-real-time by comparison routines of the Automated Monitor 140. As depicted by FIG. 8, this software module 140 continuously reads-in and compares the packet data from each of the two Good-Data Cyclic Recorders 82A and 82B to identify traffic sequences that are blocked by the firewall 150. In one configuration option, the Automated Monitor 140 generates a log of all packets and transactions that are rejected by the firewall. This log is periodically compared (either automatically or under the control of a user) to a similar log maintained by the firewall 150 to check for inconsistencies. This log-to-log comparison can be performed, for example, using a dedicated LAN connection between the firewall 150 and the controller 64. The Automated Monitor 140 can also be configured to trigger an alarm upon detecting that the firewall 150 is not operating properly.

III. Analysis Applications and Related Components

Figure 12:
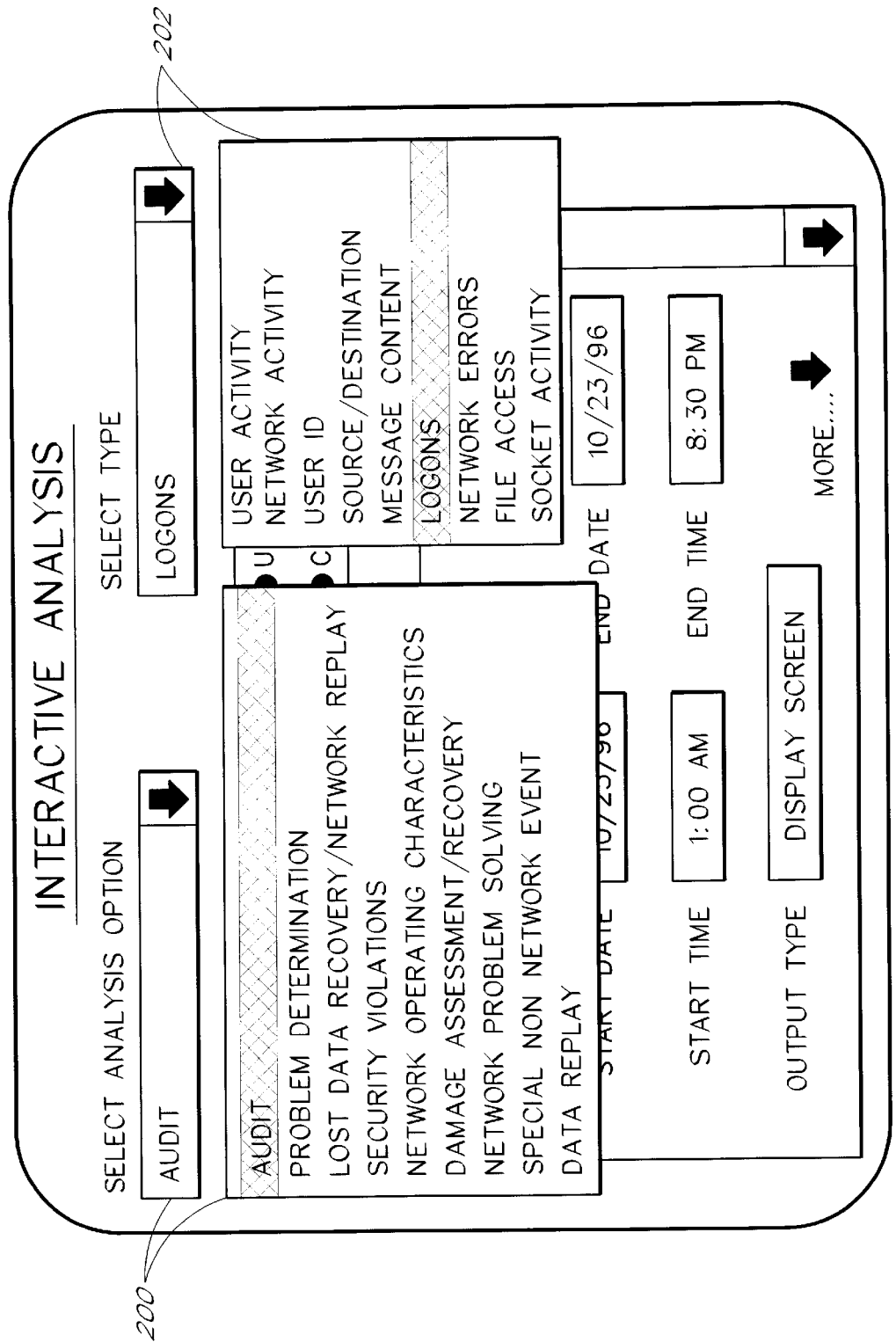

In the preferred embodiment, the Surveillance Data Processing Unit includes nine interactive analysis applications 100: Audit, Problem Determination, Lost Data Recovery/Network Replay, Damage Assessment/Recovery, Security Violations, Network Operating Characteristics, Network Problem Solving, Special Non-Network Events, and Data Replay. Each application 100 can be selectively launched by the user from the graphical user interface 104. (An initial display screen from which the user can select individual analysis applications is depicted in FIG. 12.) Multiple applications 100 can run concurrently, and can share a common database 96 of analysis data. In addition, multiple traffic databases 96 can be staged and operated at the same time. Because the applications 100 share a common graphical user interface 104 and API 148, they appear to the user as a highly integrated toolset.

Each of the nine analysis applications is described separately below. The operation of the Audit and Problem Determination applications is then further described with reference to FIGS. 12–19, which depict sample screen displays and analysis scenarios.

(i) Audit Application

The Audit application presents the user with a set of display screens which allow the user to specify various settings and parameters for selectively viewing and generating audit trails from the archived traffic data. From these screens, the user can specify such parameters as start time/date, end time/date, the type of event/s of interest (e.g., logons, file accesses, etc.). (Sample screen displays which illustrate some of the parameter and setting options are depicted in FIGS. 12–15.) The user can also specify search criteria and specific fields to be searched, and can specify an output type of either the display screen, the printer, or a file. Examples of the types of reports that can be generated using this application include the following: individual user activity; application activity; socket activity; transaction activity; logons; and unauthorized accesses to restricted files and databases.

In general, the Audit application uses the user-specified parameters and settings to generate and submit search queries to the search engine of the API 148. The results returned by the search engine are formatted by the Audit application and forwarded to the Report Generator Module 138 for display (typically on the display screen). The user can then specify additional search criteria, and/or select a "filter" option to view and "zoom-in" on specific fields of the search results.

The Audit application is further described below with reference to the sample screen displays of FIGS. 12–15.

(ii) Problem Determination Application

The Problem Determination application functions in the same general manner as the Audit application, but allows the user to identify and zoom-in on particular types of network problems such as network congestion problems and failed logon attempts. All network protocol layers and message transaction types are identified in the databases 96. The Problem Determination application is further described below with reference to the sample screen displays of FIGS. 16–19.

(iii) Lost Data Recovery/Network Replay Application

The Lost Data Recovery application includes various functionality for allowing the user to restore lost data, and for allowing the user to recreate traffic scenarios on the network 30. One feature of the application allows the user to interactively reconstruct a specific traffic sequence, and to then write the sequence to a portable storage medium (such as a tape cassette) of the Data Recovery Recorder 86 (FIG. 3). The medium can then be manually transferred to the Data Recovery Unit 76 for playback or taken to the appropriate client station. Using this feature, the user can, for example, recreate error-causing transactions, simulate load conditions, or restore lost or damaged files or messages. File recovery is supported for the following file systems and protocols: NFS, FTP, CIFS, NTFS, HTTP and Novell. One use of this application is the replaying of a previously-recorded intrusion sequence into a firewall system to test the firewall's vulnerability.

To restore a lost or damaged file, the user initially selects a FILE RECOVERY menu option, and then specifies a time period during which the file was processed. The application then invokes the search engine to identify all files that were processed during that time period, and displays a list of the files on the display screen. From this list, the user can specify the file (or files) to be restored. The application then uses the appropriate transactions for the file and rebuilds the file locally (i.e., on the controller 64). The user can then either copy the file to a standard disk, or output a file restoration sequence to the Data Recovery Recorder 86

(FIG. 3) for subsequent replay onto the network 30. Other types of network events are recreated in a similar manner.

(iv) Damage Assessment/Recovery Application

This application operates in generally the same manner as the Problem Determination and Audit applications, but includes additional features which allow the user to identify transactions that have caused system or data damage, and which allow the user to search for accesses to specific files and systems. The application also includes options for allowing the user to rebuild the lost data files via the Data Recovery Recorder 86 and Data Recovery Unit 76 (FIG. 3), and for allowing the user to examine files that were accessed.

(v) Security Violations Application

This application uses the search engine utility in combination with a set of traffic analysis routines to search for various pre-defined types of potential security problems. Using parameters specified by the user, this application searches for and generates reports of such things as: (a) repeated unsuccessful logon attempts from an outside client, (b) accesses to sensitive files, (c) accesses during non-work hours, and (d) frequent transfers of files to outside entities.

(vi) Network Operating Characteristics Application

This application processes the database records or the raw traffic data and generates a report of pre-defined network operating characteristics. The report includes statistics on congestion, peak loads, traffic throughput, network outages, and utilization. The report is output to the Report Generation Module 138 for display.

(vii) Network Problem Solving Application

This application utilizes the search engine and other API utilities to identify and generate a report of a predefined set of network-level problems. Depending upon the network type, these network-level problems may include, for example, frequent data collisions, checksum errors, transmissions to nonexistent entities, and excessive traffic from a particular node. The reports are output to the Report Generation Module 138 for display. To fully utilize this application, the archival recordings can be generated with the packet filtering option of the Archival Data Processing Module 90 turned OFF.

Figure 9:
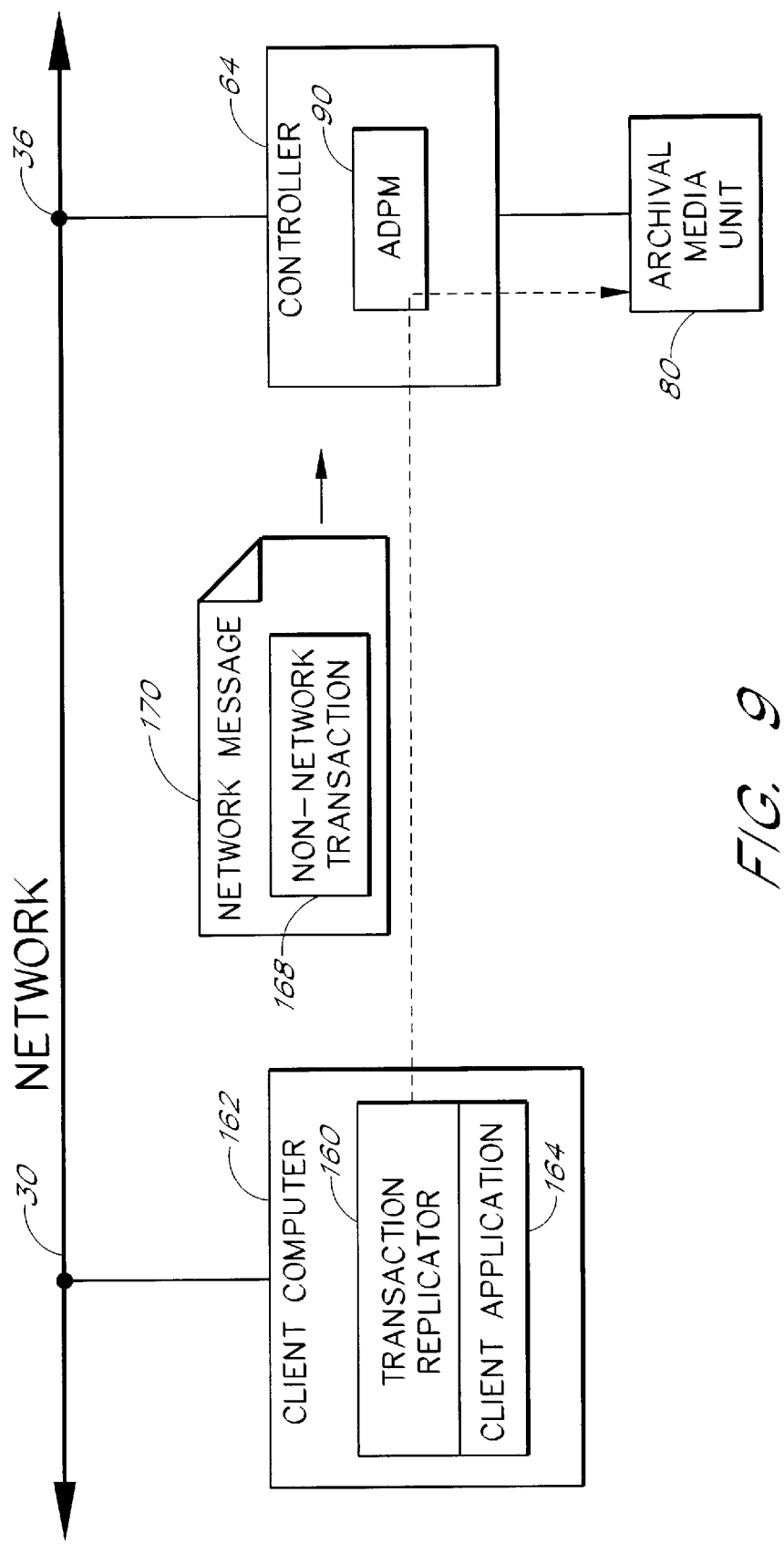
FIG. 9 illustrates the use of a transaction replication module to enable non-network events to be monitored by the system.

(viii) Special Non-Network Events Application (FIG. 9)

This application functions in combination with a special client-side software driver which runs on one or more other computers of the network 30 to enable the tracking of non-network client events. By way of background, certain types of transactions performed locally on networked client (user) computers do not result in a transmission of data on the network—and thus are not recorded by the Archival Media Unit 80—yet are important from the standpoint of monitoring. Examples of such non-network transactions include the following: remote sessions and file transfers (e-mails, files, etc.) using a locally-attached modem; accesses to non-monitored networks, and deletions of locally-stored files.

As depicted by FIG. 9, this problem is overcome by providing a special software driver, referred to as the Transaction Replicator 160, which runs continuously (in the background) on the client computer 162 to monitor transactions generated by a client application 164 (or possibly a collection of client applications). The client application 164 may, for example, be a word processing program, an e-mail application, or a Web browser. When the client application 164 generates a non-network transaction of a pre-specified type, the Transaction Replicator 160 encapsulates a copy of the transaction 168 (or a representation thereof) within a network message 170 (using a predefined encapsulation format which is known to the Special Non-Network Events application), and then transmits the network message 170 on the network 30 to a nonexistent or predefined entity. This causes the network message 170 to be recorded by the Archival Media Unit 80 (and possibly one of the cyclic recorders 82, 84, depending upon the configuration settings). During subsequent off-line analysis, the Special Non-Network Events application (not shown) automatically detects these messages 168 and makes the encapsulated non-network transactions available for tracking and auditing.

As will be appreciated by those skilled in the art, this method can be used to monitor a wide range of user activities, including activities that are probative of employee productivity and misconduct.

Figure 10:
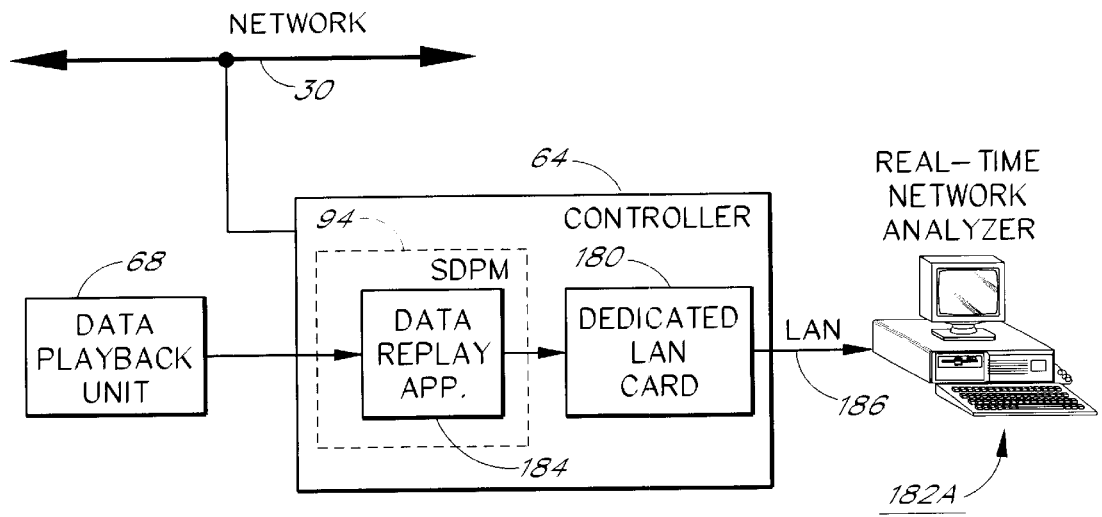
FIGS. 10 and 11 illustrate two respective configuration options for using a data replay application to re-play traffic recordings into a conventional real-time network analyzer.
Figure 11:
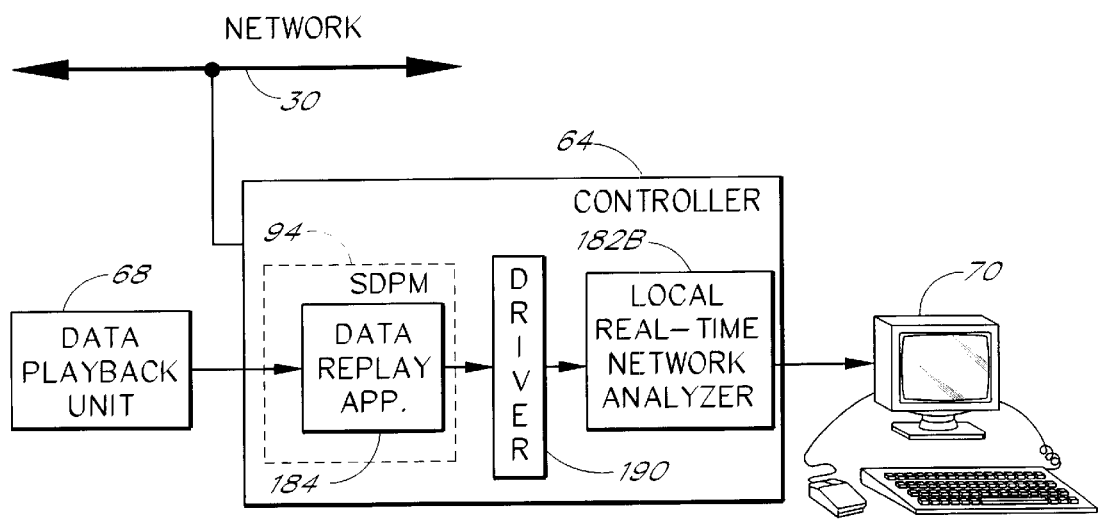

(ix) Data Replay Application (FIGS. 10 and 11)

The Data Replay application allows the user to replay archival recordings generated by the Archival Media Unit 80 into a commercially-available, real-time network analyzer such as the Novell Lanalyzer™ or the Network General Sniffer™. Two configuration options are supported—one which involves the use of a separate computer to run the commercially-available network analyzer software (FIG. 10), and a second which involves the use of the controller 64 to run the network analyzer software (FIG. 11). In both configurations, the Data Playback Unit 68 acts as a data pump for replaying the archival recordings, and the Data Replay application 184 acts essentially as a real-time traffic formatter.

As depicted by FIG. 10, the first option involves the use of a dedicated LAN card 180 to connect the controller 64 to a real-time network analyzer computer 182A via a separate LAN connection 186. The LAN connection 186 is separate from the network 30 being monitored, and thus does not interfere with the passive recording and monitoring functions of the controller 64. As depicted by FIG. 11, the second option eliminates the need for the LAN connection 186 and the separate computer 182A by using a special driver interface 190 ("driver") which presents the traffic to the commercially-available network analyzer 182B as if coming off a network.

In operation (of both configuration options), the archived data is read-in from the Data Playback Unit 68 by the Surveillance Data Processing Module 94, and is processed substantially in real-time by the Data Replay application 184. During the read-in process, the decryption engine (FIG. 7) decrypts the archived data if encrypted, and the staging filter 144 (FIG. 7) applies any filtering criteria that have been specified by the user. The staging filter 144 can be used, for example, to limit the analysis to certain types of traffic. The Data Replay application 184 extracts the date/time stamps from the incoming packet stream, and forwards the packets to the network analyzer 182A, 182B (either via the LAN 186 or the driver 190). In one mode of operation, the Data Replay application forwards the packets to the real-time network analyzer 182A, 182B based on the date/time stamps within the incoming packet stream, so that the original timing of the traffic sequence is restored.

(x) Example Screen Displays (FIGS. 12–19)

The operation of the analysis applications 100 will now be described in further detail with reference to two sequences of example screen displays. The first sequence, depicted in FIGS. 12–15, illustrates the use of the Audit application to analyze logon data. The second sequence, depicted in FIGS. 16–19, illustrates the use of the Problem Determination application to analyze rejected logon attempts. The traffic data which appears in these screen displays is fictitious.

FIG. 12 depicts the initial screen display which appears when the user selects an INTERACTIVE ANALYSIS option from a main menu of the Surveillance Data Processing Module 94. The selection boxes 200, 202 corresponding to the ANALYSIS OPTION and TYPE selections are shown in expanded form. From the ANALYSIS OPTION box 200, the user can select an analysis option which corresponds to one of the nine analysis applications 100. The selection of an analysis option brings up a corresponding list of options within the TYPE selection box 202. In some cases, multiple TYPE options can be selected at-a-time. In the FIG. 12 example, the user has selected the "Audit" application and the "Logons" type.

FIG. 13 depicts the screen display which appears following the selection of "Audit" and "Logons." The PARAMETERS AND SETTINGS box 208 at the bottom of the screen allows the user to specify various parameters for controlling the audit of logon activity. The parameter options which appear in this box 208 vary according to the ANALYSIS OPTION and TYPE selected by the user. An ALARMS box 210 displays the present status of any visual alarms that are enabled within the Automated Monitor application 140 (FIG. 7).

Figure 14:
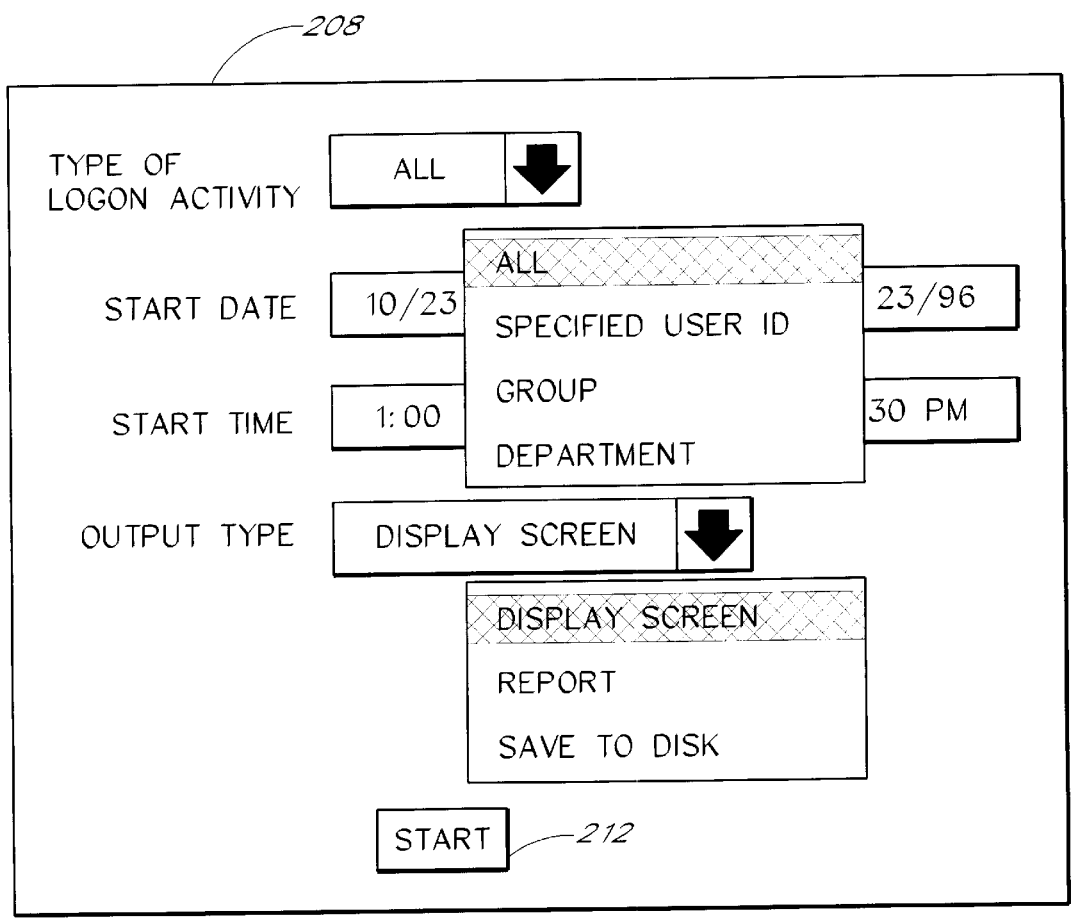

An expanded view of the PARAMETERS AND SETTINGS box 208 is shown in FIG. 14, with the TYPE OF LOGON ACTIVITY and OUTPUT TYPE selection boxes shown in their expanded forms. From this box 208, the user can select the start and end dates, the start and end times, the output type (DISPLAY SCREEN, REPORT, or SAVE TO DISK), and the type of logon activity of interest (ALL, SPECIFIC USER ID, GROUP, or DEPARTMENT). The default date and time values initially displayed in the START and END fields correspond to the segment of archived data (if any) currently loaded into the traffic analysis databases 96. If the user enters a date or time value which does not fall within this range, the user is prompted to stage the additional traffic data to the databases 96. Once the parameters have been set, the user can select the START button 212 to initiate the audit search.

FIG. 15 depicts the results screen generated by the Audit application. Each line in the results box 216 represents and includes various information about a separate logon event. From this display screen, the user can select a FILTER button 218 to filter the displayed data so that only the fields of interest are displayed. In addition, the user can select the SEARCH button 220 to initiate additional searches of the database 96.

Figure 16:
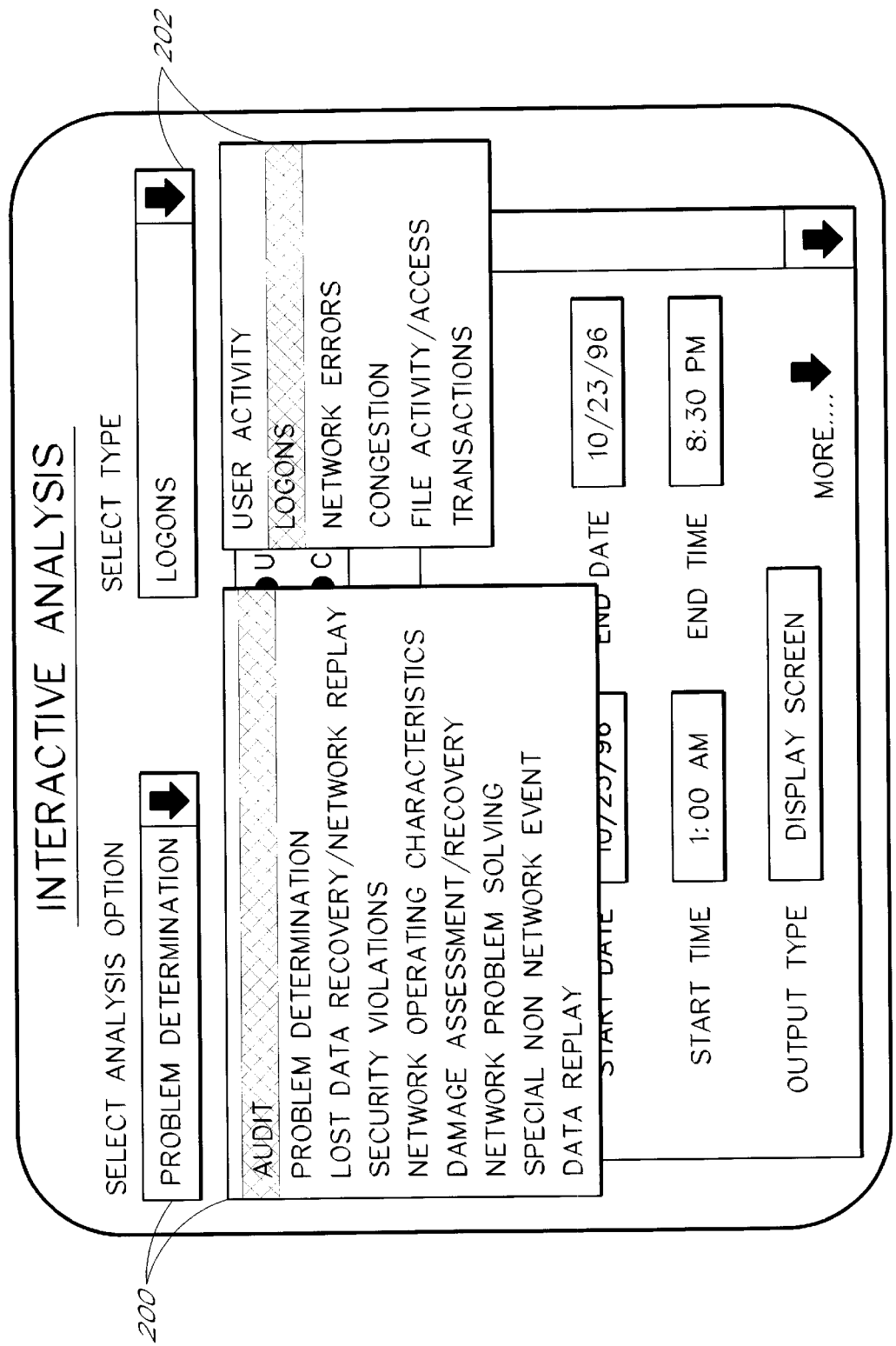
Figure 18:
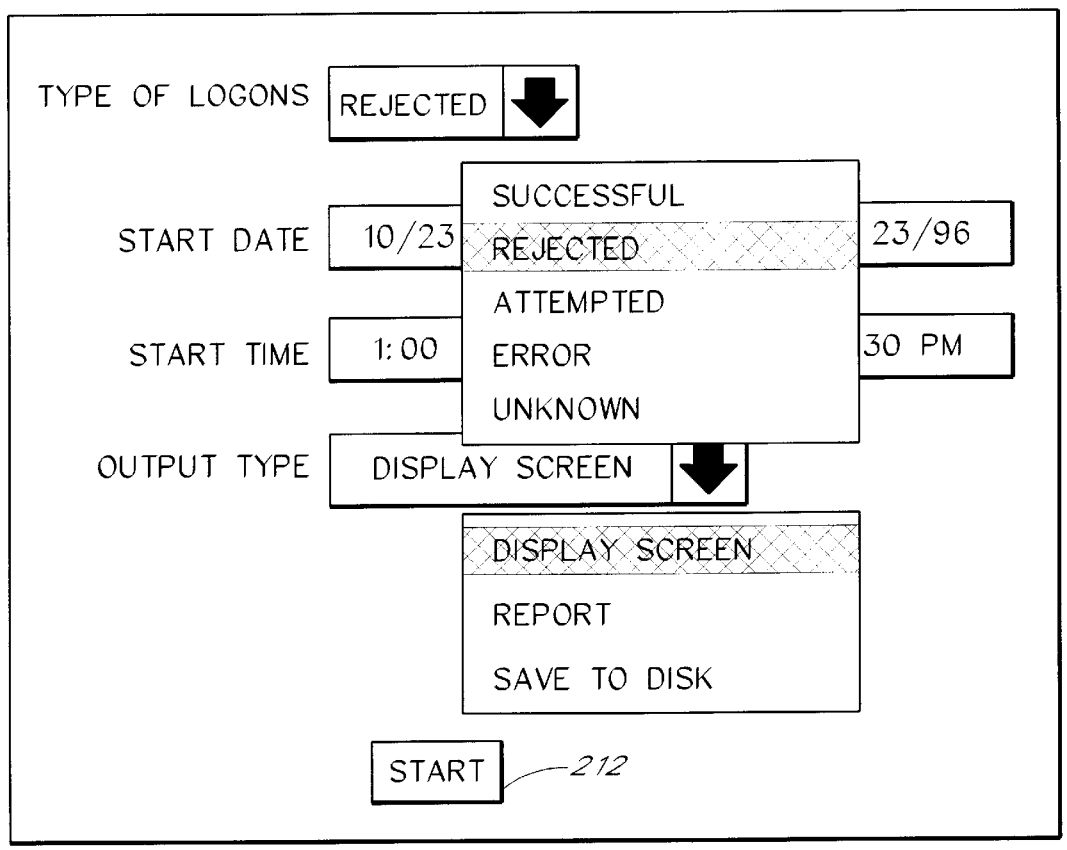

FIGS. 16–19 illustrate the use of the Problem Determination application. As illustrated in FIG. 16, selection of the "Problem Determination" option results in the display of six options in the TYPE selection box 202: USER ACTIVITY, LOGONS, NETWORK ERRORS, CONGESTION, FILE ACTIVITY/ACCESS, and TRANSACTIONS. In this example, the user has selected LOGONS as the event to evaluate. As illustrated by FIG. 18, the parameter options that correspond to the FIG. 16 settings are similar to those for the above Audit example, except that the user can now select from a different set of logon event types: SUCCESSFUL, REJECTED, ATTEMPTED, ERROR, and UNKNOWN. As illustrated by FIG. 19, the results of the Problem Determination search are displayed using the same general display format as for the Audit search.

Although this invention has been described in terms of certain preferred embodiments, other embodiments that are apparent to those or ordinary skill in the art are also within the scope of this invention. Accordingly, the scope of the present invention is intended to be defined only by reference to the appended claims.

In the claims which follow, reference characters used to designate claim steps are provided for convenience of description only, and are not intended to imply any particular order for performing the steps.

What is claimed is:

1. A computer system for facilitating a post-event reconstruction and analysis of a security breach or other catastrophic event on a computer network, the system comprising:

network interface circuitry configured to passively and continuously capture all valid data-link-level network traffic at a network connection point to generate a packet stream, the packet stream comprising raw data packets that are transmitted on the network by other computer systems of the network;

at least one computer processor configured to process the packet stream to generate an archival data stream;

a data recording unit operatively coupled to the processor, the recording unit configured to record the archival data stream onto a non volatile storage medium to generate a low-level archival recording of network traffic, the processor incapable of modifying the recorded archival data stream;

a data playback unit operatively coupled to the processor, the playback unit configured to play back the previously recorded archival data stream as computer network traffic on the computer network at the network connection point to recreate computer network traffic events as they previously occurred when recorded, the previously recorded archival data stream is transmitted on the computer network at the network connection point and flows through the computer network as the archival data stream originally flowed through the computer network;

a first cyclic data recorder coupled to the processor that cyclically records a daily portion of the packet stream onto a second recording medium to generate a record of the network traffic; and a second cyclic data recorder that cyclically records a daily filtered portion of the packet stream onto a third recording medium to generate a record of a portion of the network traffic.

2. The computer system according to claim 1, wherein the network circuitry and the processor are configured such that the archival data stream contains sufficient information to reconstruct substantially all valid data packets that are receivable at the network connection point.

3. The computer system according to claim 1, wherein the packet stream comprises substantially all valid data-link-level traffic that is presented at the network connection point.

4. The computer system according to claim 1, wherein the processor is configured to insert packet timestamps into the packet stream, the packet timestamps forming a part of the archival recording and reflecting network transmission times of packets contained within the recording.

5. The computer system according to claim 1, wherein the processor is configured to apply an encryption method to the packet stream, so that the raw data packets of the packet stream are stored on the non-volatile storage medium in an encrypted form.

6. The computer system according to claim 1, wherein the processor is configured to implement a bad-packet filter to filter out packets of at least one predetermined type from the packet stream, the bad packet filter reducing a storage burden for the storage of network traffic onto the storage medium.

7. The computer system according to claim 6, further including filter configuration software which allows a user of the computer system to selectively enable and disable the bad-packet filter, and wherein the archival data stream contains all valid packet data receivable at the connection point when the bad-packet filter is set to a disabled state.

8. The computer system according to claim 1, wherein the storage medium comprises magnetic tape.

9. The computer system according to claim 8, wherein the data recording unit comprises an automated tape library.

10. The computer system according to claim 1, wherein the data recording unit is configured to operate as a write-once storage device.

11. The computer system according to claim 1, further comprising interactive traffic analysis software for enabling a user to interactively view and analyze traffic data stored in the archival recording in an off-line analysis mode, the interactive traffic analysis software including a search engine for enabling the user to conduct interactive searches of the traffic data.

12. The computer system according to claim 1, further comprising:

an automated monitoring module configured to automatically read traffic data from the first cyclic data recorder and the second cyclic data recorder and to monitor read-in traffic data for anomalies.

13. The computer system according to claim 12, wherein the automated monitoring software module is configured to trigger an alarm upon detecting a pre-specified network anomaly.

14. A method of generating an archival record of network traffic on a computer network, comprising the computer-implemented steps of;

passively and continuously capturing all valid data packets that are receivable at a connection point to the network to generate a packet stream;

processing the packet stream to generate an archival data stream;

storing the archival data stream on a non-volatile storage medium;

storing a daily portion of the packet stream onto a second recording medium to generate a record of the network traffic with a first cyclic data recorder;

storing a daily filtered portion of the packet stream onto a third recording medium to generate a record of a portion of the network traffic with a second cyclic data recorder; and playing back the previously recorded archival data stream as computer network traffic on the computer network to recreate computer network traffic events as they previously occurred when recorded, the previously recorded archival data stream is transmitted on the computer network at the connection point and flows through the computer network as the archival data stream originally flowed through the computer network.

15. The method according to claim 14, wherein the step of capturing comprises monitoring the network traffic with a network interface card that resides within a host computer, the network interface card configured to operate in a receive-only mode in which all data-link-level traffic present at the connection point is forwarded to the host computer.

16. The method according to claim 15, wherein the step of storing comprises sending the archival data stream from the host computer to a peripheral storage device that is configured to operate in a write-once recording mode.

17. The method according to claim 14, wherein the step of processing the packet stream comprises inserting timestamps into the packet stream to facilitate a subsequent reconstruction of events on the network.

18. The method according to claim 14, wherein the step of processing the packet stream comprises encrypting at least a portion of the packet stream.

19. The method according to claim 14, wherein the step of storing comprises writing the archival data stream to magnetic tape.

20. The method according to claim 19, wherein the step of writing is performed at least in-part by an automated tape library.

21. The method according to claim 14, further comprising the computer implemented steps of:

reading-in and analyzing network traffic stored by the first cyclic data recorder and the second cyclic data recorder to provide automated near-real-time analysis of the network traffic.

22. A method of monitoring traffic on a computer network without adding latency to the traffic, comprising the computer-implemented steps of:

(a) passively and continuously capturing all valid data packets at a network connection point to generate a packet stream;

(b) writing a daily portion of the packet stream onto a recording medium to generate a record of the network traffic with a first cyclic data recorder;

(c) writing a daily filtered portion of the packet stream onto a second recording medium to generate a record of a portion of the network traffic with a second cyclic data recorder;

(d) automatically reading-in and analyzing traffic data stored on the recording medium in steps (b) and (c) to search for at least one predefined traffic anomaly, to thereby provide near-real-time analysis of the traffic, wherein the predefined anomaly relates to a particular packet stream; and (e) playing back the previously recorded packet stream as computer network traffic on the computer network to recreate computer network traffic events as they previously occurred when recorded, the previously recorded data stream is transmitted on the computer network at the network connection point and flows through the computer network as the data stream originally flowed through the computer network.

23. The method according to claim 22, wherein the step of writing is performed using a cyclic recording device.

24. The method according to claim 22, wherein the step of automatically reading-in and analyzing traffic data comprises performing at least one virus check on the traffic data.

* * * * *